United States Patent
Pao et al.

(10) Patent No.: US 11,102,793 B2
(45) Date of Patent: *Aug. 24, 2021

(54) METHOD AND APPARATUSES FOR CONTROLLING QUALITY OF EXPERIENCE BASED ON UE-ASSISTED FEEDBACK

(71) Applicant: Industrial Technology Research Institute, Hsinchu (TW)

(72) Inventors: Wei-Chen Pao, Hsinchu County (TW); Tzu-Jane Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 87 days.

This patent is subject to a terminal disclaimer.

(21) Appl. No.: 16/594,084

(22) Filed: Oct. 7, 2019

(65) Prior Publication Data

US 2020/0037334 A1 Jan. 30, 2020

Related U.S. Application Data

(63) Continuation of application No. 15/659,621, filed on Jul. 26, 2017, now Pat. No. 10,485,005.

(60) Provisional application No. 62/366,633, filed on Jul. 26, 2016.

(51) Int. Cl.
| | |
|---|---|
| *H04W 72/12* | (2009.01) |
| *H04W 72/08* | (2009.01) |
| *H04L 1/18* | (2006.01) |
| *H04W 76/15* | (2018.01) |
| *H04L 5/00* | (2006.01) |
| *H04W 72/04* | (2009.01) |
| *H04B 7/06* | (2006.01) |
| *H04L 1/16* | (2006.01) |
| *H04W 24/04* | (2009.01) |
| *H04W 84/12* | (2009.01) |
| *H04W 24/10* | (2009.01) |
| *H04L 1/12* | (2006.01) |

(52) U.S. Cl.
CPC ........ *H04W 72/085* (2013.01); *H04B 7/0619* (2013.01); *H04L 1/1607* (2013.01); *H04L 1/1812* (2013.01); *H04L 1/1825* (2013.01); *H04L 5/001* (2013.01); *H04L 5/0053* (2013.01); *H04W 72/0413* (2013.01); *H04W 72/12* (2013.01); *H04W 72/1231* (2013.01); *H04W 76/15* (2018.02); *H04L 5/006* (2013.01); *H04L 2001/125* (2013.01); *H04W 24/04* (2013.01); *H04W 24/10* (2013.01); *H04W 72/0406* (2013.01); *H04W 84/12* (2013.01)

(58) Field of Classification Search
CPC .................................................... H04L 12/28
USPC ........................................................ 370/329
See application file for complete search history.

(56) References Cited

U.S. PATENT DOCUMENTS

2020/0229206 A1\* 7/2020 Badic .................... H04W 16/32

\* cited by examiner

*Primary Examiner* — Dang T Ton
(74) *Attorney, Agent, or Firm* — JCIPRNET

(57) ABSTRACT

The disclosure is directed to a method and apparatuses for controlling quality of experience (QoE) based on UE assisted feedback. In one aspect, the method would include not limited to: receiving an enable indicator which indicates a first feedback signaling to be transmitted; performing a quality of experience (QoE) evaluation for fulfilling a performance requirement; and transmitting the first feedback signaling including a first preferred configuration of licensed wireless connection in response to performing the QoE evaluation, wherein the wireless connection comprises a licensed wireless connection and a licensed-assisted access connection.

24 Claims, 14 Drawing Sheets

METHOD AND APPARATUSES FOR CONTROLLING QUALITY OF EXPERIENCE BASED ON UE-ASSISTED FEEDBACK

CROSS-REFERENCE TO RELATED APPLICATION

This application is a continuation application of and claims the priority benefit of U.S. application Ser. No. 15/659,621, filed on Jul. 26, 2017, now allowed, which claims the priority benefit of U.S. provisional application Ser. No. 62/366,633, filed on Jul. 26, 2016. The entirety of each of the above-mentioned patent applications is hereby incorporated by reference herein and made a part of this specification.

TECHNICAL FIELD

The disclosure is related to a method and apparatuses for controlling quality of experience (QoE) based on user equipment (UE) assisted feedback.

BACKGROUND

The Third Generation Partnership (3GPP) has aimed to incorporate the wireless local area network (WLAN) to order to improve the current communication technology. The 3GPP/WLAN radio interworking Release-12 (Rel-12) has proposed a solution related to Core Network (CN) based WLAN offloading so as to improve the overall user quality of experience (QoE) and network utilization by providing more control to the network operators. These improvements could be further enhanced by Long Term Evolution (LTE)/WLAN aggregation and LTE/WLAN interworking enhancements that are relevant to both co-located and non-co-located deployment scenarios. A WLAN termination node (WTN) currently may include one or more access points (APs). User Equipment (UEs) that are capable of connecting to multiple radio access technologies (RAT) may initiate a WLAN measurement report while an eNB configures the UE to perform WLAN measurements which may include measurements of frequency, channel, WLAN identifier, and etc. Furthermore, deployment scenarios in the next generation access technologies may include WLAN/AP or nodes supporting licensed/unlicensed spectrum. Detailed description of these next generation access technologies could be found in 3GPP TR 38.913, 3GPP TR 38.804, 3GPP R2-164306 which are incorporated by reference for which is incorporated by reference for supplementing the terms and concepts of the disclosure.

For example, as shown in FIG. 1A, "M node" of FIG. 1 could be an eNB, a new radio (NR) node, a LTE node, a transmission/reception point (TRP), and so forth. The "S node" could be an eNB, a WLAN, a NR node, a Licensed-Assisted access (LAA) node, a high frequency node, an unlicensed frequency node, a distributed node, a TRP, and so forth. UEs (e.g. UE_1, UE_2, UE_3, UE_4, UE_5, UE_6) capable of LTE-WLAN aggregation (LWA)/dual connectivity (DC)/LAA functionalities could be configured with split/configurable/LWA/LAA bearer. Currently, the enhanced LWA (eLWA) system builds on the Rel-13 LWA framework without departing from the LWA architecture and thus supports WLAN nodes deployed and controlled by operators and their partners. FIG. 1B illustrates the current R-13 LWA framework which utilizes a split bearer scheme including at least a split LTE bearer and a split LWA bearer. The detailed principle of operation of FIG. 2 is recorded in R2-162183 which is incorporated by reference for supplementing the terms and concepts of the disclosure. The objectives of this work item are to specify an additional feature of LWA directed to uplink (UL) data transmission for WLAN, including UL bearer switch and bearer split.

In 3GPP TSG RAN WG2 #94 meeting minutes, RAN2 concluded the following agreements including: 1. Sending a PDCP PDUs to WLAN is based on "some" eNB control without impacting existing WLAN MAC. (This eliminates full per packet eNB scheduling of WLAN and eliminates full UE implementation). 2. Only support split bearer type for Rel-14 eLWA UL. 3. UE could be configured so that traffic on the UL split bearer could only be submitted for transmission on both, WLAN only or LTE only.

SUMMARY OF THE DISCLOSURE

Accordingly, the disclosure is directed to a method and apparatuses for controlling QoE based on UE assisted feedback.

In one aspect, the disclosure is directed to a method used by a user equipment for controlling QoE based on UE assisted feedback. The method would include not limited to: receiving an enable indicator which indicates a first feedback signaling to be transmitted; performing a quality of experience (QoE) evaluation for fulfilling a performance requirement; and transmitting the first feedback signaling including a first preferred configuration of licensed wireless connection in response to performing the QoE evaluation, wherein the wireless connection comprises a licensed wireless connection and a licensed-assisted access connection.

In one aspect, the disclosure is directed to a user equipment which would include a transmitter, a receiver, and a processor coupled to the transmitter and the receiver. The processor is configured at least to: receive, by the receiver, an enable indicator which indicates a first feedback signaling to be transmitted; perform a quality of experience (QoE) evaluation for fulfilling a performance requirement; and transmit, via the transmitter, a first feedback signaling comprising a first preferred configuration of an aggregate configuration in response to performing the first QoE evaluation, wherein, wherein the wireless connection comprises a licensed wireless connection and a licensed-assisted access connection.

In one aspect, the disclosure is directed to a base station which would include a transmitter, a receiver, and a processor coupled to the transmitter and the receiver. The processor is configured at least to: receive a first feedback signaling comprising a preferred configuration of a wireless connection, wherein the preferred configuration comprises a preferred direction and the wireless connection comprises a licensed wireless connection and a licensed-assisted access connection; transmit a first configuration message which comprises a status report inquiry and a measurement inquiry associated with one or more radio access technologies (RATs) in response to receiving the first feedback signaling; receive a second feedback signaling comprising a measurement report associated with the measurement inquiry in response to transmitting the first configuration message; and transmit a second configuration message to update the preferred configuration in response to receiving the measurement report.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
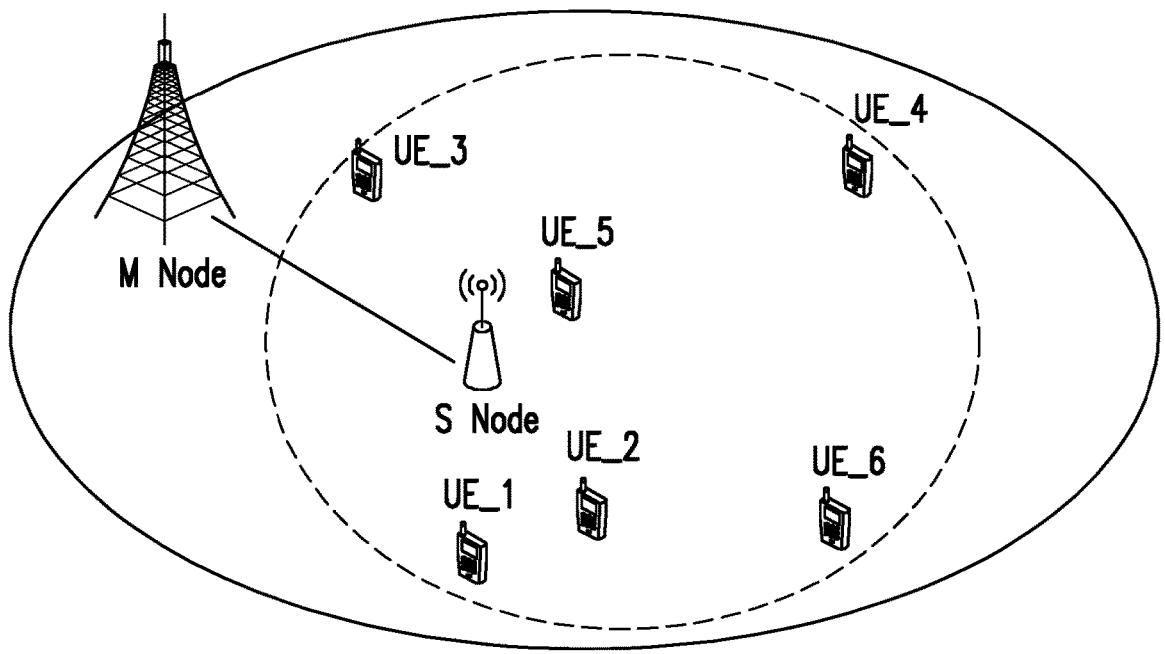
FIG. 1A illustrates a hypothetical LWA system as an example.
Figure 1B:
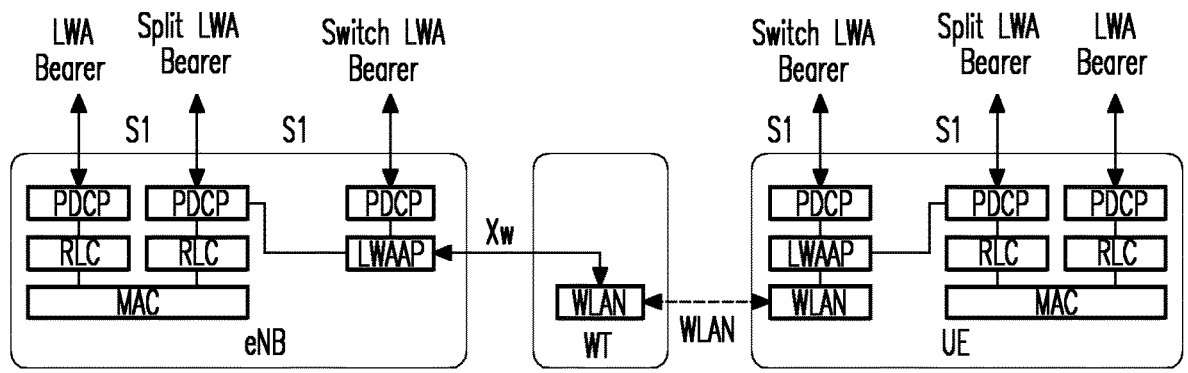
FIG. 1B illustrates data transmission of WLAN which uses UL split bearer according to Rel-13.

Reference will now be made in detail to the present exemplary embodiments of the disclosure, examples of which are illustrated in the accompanying drawings. Wherever possible, the same reference numbers are used in the drawings and the description to refer to the same or like parts.

From the background description, several technical challenges could be encountered. First, WLAN scheduling may not be suitable for LTE since a WLAN transmission is not generally scheduled but is instead in response to a clear channel assessment (CCA) as the WLAN air interface is typically time multiplexed between UL/downlink (DL) of all stations (e.g. UEs) and APs that are sharing the same channel. (2) WLAN (e.g., UL grant) may not be controlled by eNB which gives uplink grants for LTE while the UE uses WiFi to transmit buffered data. (3) Coexistence with user preference or user experience could be problematic as a UE may decide when and how much data to transmit on WLAN, but such implementation may not be reliable or predictable. (4) The question of whether and how the eNB would control the transmission for WLAN for uplink would remain open. Thus, some of these potential challenges would need to be resolved.

Table 1 and Table 2 below summarizes the motivation, the cause, the perspective in views of users/system/network, and suitable solutions. Instances of 'TX' from Table 1 and Table 2 could be a UE, and instances of 'RX' could be an eNB or access point (AP). WLAN resource may refer to radio resource, hardware resource, buffer, transceiver, RF module/chain, WLAN module, TX/RX opportunity/duration of a WALN, baseband processor, antenna, etc.

not fulfilled (e.g., low QoS, low data rate, low Modulation and Coding Scheme (MCS), high error rate, etc.).

This disclosure considers a scenario in which any UE which supports split bearers would also be capable of DC or LWA functionalities. An eNB may need to determine the UL direction for a UE served by the eNB via a direction command which may include, LTE direction/connection, WLAN direction/connect, or both LTE and WLAN. This

TABLE 1

| Motivation | CCA | Cause | Perspective | Solution |
| --- | --- | --- | --- | --- |
| A mechanism or process to deal with problems when using WLAN | failure | A1. Busy Medium e.g., too many UEs use/occupy WLAN resource, and CCA failure is increased (e.g., RSSI over a threshold) | TX: high RSSI level RX: reduced traffic amount | eNB to modify UL direction, e.g., both, LTE or WLAN (B1) eNB to assist UE to |
| | Success | A2. Busy Medium e.g., bad channel condition, and low MCS level | TX: reduced data rate due to pathioss RX: reduced traffic amount | connect/associate with a specific channel number/AP |
| | | A3. Busy Medium e.g., interference causes higher error rate at receiver. | TX: not aware RX: increased error rate | (A2 · A3) eNB to reduced the number of UE to |
| | | B. Traffic Congestion B1. e.g., bad design of traffic routing in UE implementation B2. e.g., not enough WLAN resource | TX: increased buffered data or increased buffer latency RX: not aware, or reduced traffic amount | connect/associate with the same WLAN/AP (A1 · B2) |
| Optimized WLAN transmission | | C: Traffic Demand Only UE knows, e.g., inform while higher layer (e.g., application layer) is aware of huge traffic amount coming or happening | | eNB to assist to connect/associate with a specific channel number/AP |
| | | D: UE Preference | | eNB to modify UL direction, e.g., both, LTE or WLAN |

TABLE 2

| Motivation | Cause | Solution |
| --- | --- | --- |
| A mechanism or process to deal with problems when using WLAN | A. Bad channel condition A1. e.g., too many UEs use/occupy WLAN resource, and CCA failure is increased (e.g., RSSI over a threshold) A2. e.g., bad channel condition, and low MCS level A3. e.g., interference causes higher error rate at receiver. B. Traffic Congestion B1. e.g., bad design of traffic routing in UE implementation B2. e.g., not enough WLAN resource | eNB to modify UL direction, e.g., both, LTE or WLAN (B1) eNB to assist UE to connect/associate with a specific channel number/AP (A2 · A3) eNB to reduced the number of UE to connect/associate with the same WLAN/AP (A1 · B2) |
| Optimized WLAN transmission | C: Traffic Demand Only UE knows, e.g., inform while higher layer (e.g., application layer) is aware of huge traffic amount coming or happening D: UE Preference | eNB to assist UE to connect/associate with a specific channel number/AP eNB to modify UL direction, e.g., both, LTE or WLAN |

Solutions in Table 1 and Table 2 could be applicable to all cases. Cases or causes may include 'busy medium' (e.g. 'bad channel condition'), 'traffic congestion', 'traffic demand', 'UE preference', and etc. However, there may be one suitable solution to deal with problems when using S node (e.g., WLAN or AP) in each case. For example, the solution of eNB to modify UL direction, e.g., both, LTE or WLAN, could be suitable to case B1 and case D. The solution of eNB to assist UE to connect or associate with a specific channel number or AP may be suitable to case A2, case A3, and case C. The solution of eNB to reduce the number of UEs to connect or associate with the same WLAN or AP may be suitable to Case A1 and B2. 'Busy medium' could be the same as bad channel condition. For example, if a UE fails to occupy a resource of a channel, the transmission quality is disclosure also presents a mechanism to help the eNB to make a decision of direction command for the UL split bearer of the UE.

Previously, the determination of the UL direction in a split bearer setup is determined solely by the eNB. One of the main issues is that eNB has no or little information from UEs or WLANs to determine the UL direction for the UE. Such eNB could may thus be unaware of user experience or operational status because of lacking explicit feedbacks. Therefore, the solutions of the disclosure may allow the eNB to dynamically or efficiently operate or manage the system such as by accurate and dynamic configuration of UL direction of split bearers through UE's direction command, if eNB could be aware of causes of bad user experience or unreliable operations. The eNB may provide better solutions or consider more situations to determine the UL direction of split bearer or UE's direction command. Consequently, the UE may have better experience in the UL transmission or the usage of WLAN.

This disclosure discloses techniques for UEs or WLAN to reflect user experience or operational status to the eNB. Via the reflection of information from the UE or WLAN, eNB may acknowledge UEs or WLANs' status and subsequently better control the system. With the assistance of information from the UEs and WLANs such as feedback information or status report (e.g., buffer status report, PDCP status report, WLAN status report, etc.), an eNB may determine the direction command based on the feedback information.

This disclosure provides the addition of new triggering events, the enhancement of feedback information, the assistance of configuration/modification/update of direction command, the usage of WLAN or LWA functionality, the balance or the management of the system, the improvement to the system performance, the process to resolve user's bad experience, or the dissatisfaction or the inadequacy of eNB's configuration from UEs. The subsequent disclosure provides the design of triggering events and feedback information in further detail.

Figure 2B:
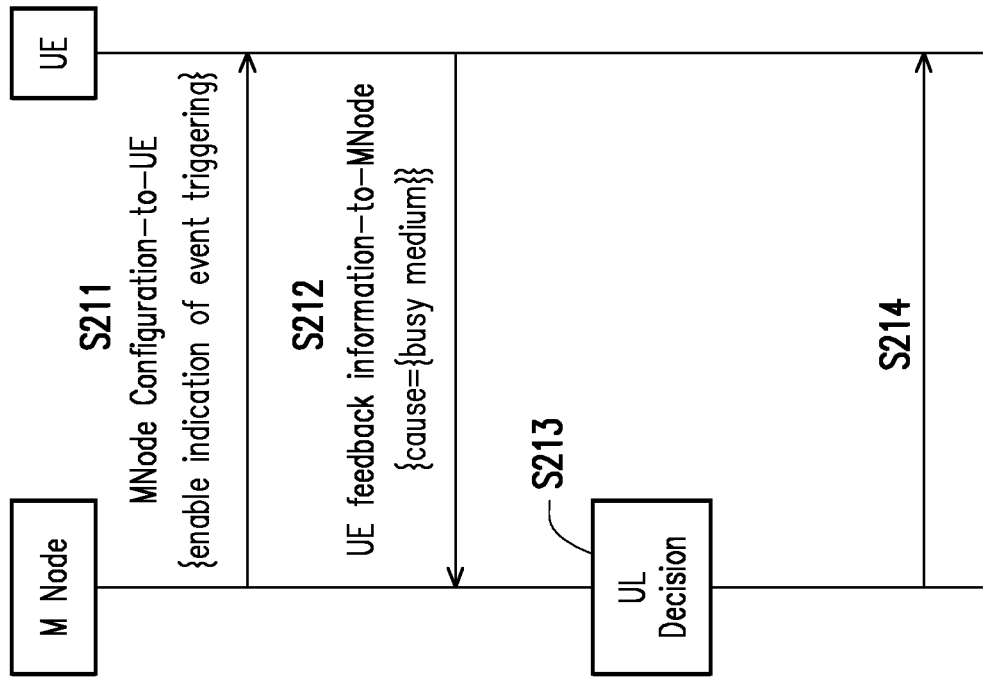
FIG. 2B illustrates a method of controlling configurable split bearer based on user equipment (UE) assisted feedback from the perspective of a base station in accordance with one of the exemplary embodiments of the disclosure.
Figure 2A:
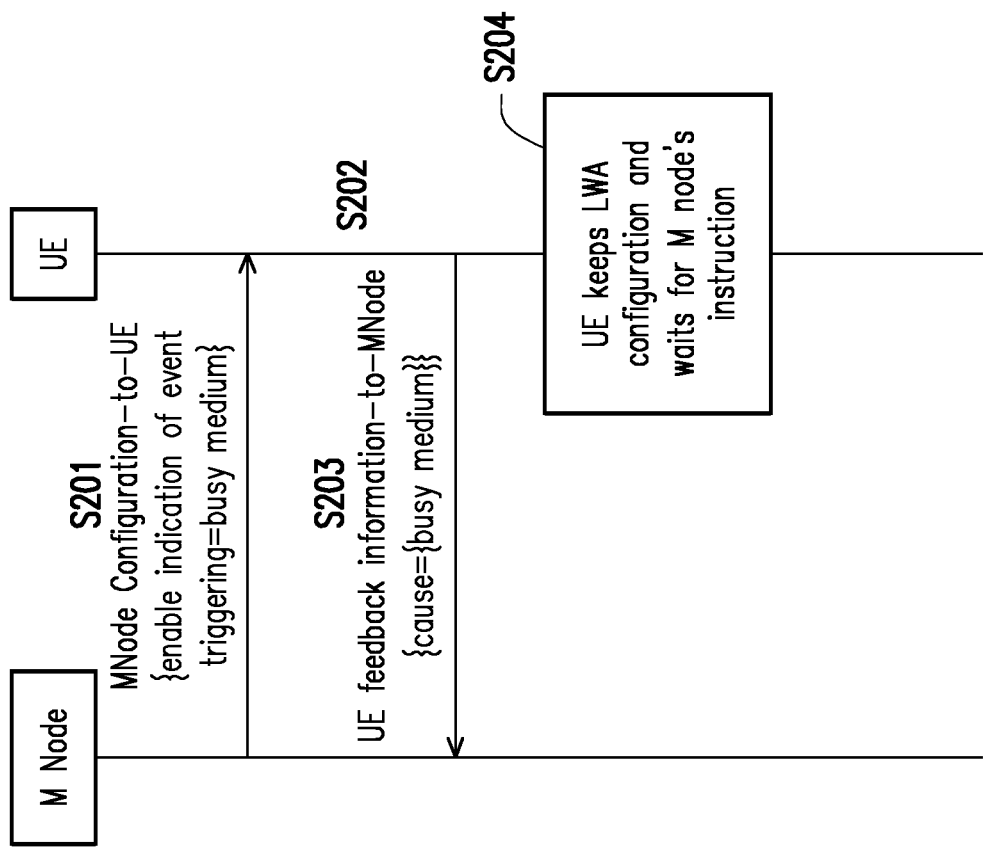
FIG. 2A illustrates a method of controlling configurable split bearer based on user equipment (UE) assisted feedback from the perspective of a UE in accordance with one of the exemplary embodiments of the disclosure.

The disclosed method and apparatuses for controlling configurable split bearer (e.g., configurable split bearer may be associated with a bearer identifier) based on UE assisted feedback are summarized in FIG. 2A~FIG. 2D and their corresponding written description. FIG. 2A illustrates a method of controlling configurable split bearer based on UE assisted feedback from the perspective of a UE. In step S201, the UE would receive a first configuration message including an enable indicator which indicates that a first feedback signaling is to be transmitted in response to satisfying any one or a combination of a plurality of triggering events. The first feedback signal may include a first preferred configuration which may include one or a combination of a direction command, a status report, a measurement report, an updating cause, a preferred direction, a preference direction, and a preference indication. The first preferred configuration would be for a wireless connection. The wireless connection may include a licensed wireless connection and/or a licensed-assisted access connection. The first configuration message may further include a status report inquiry. In step S202, the UE may have detected that a first WLAN is temporarily unavailable which satisfies one of the plurality of triggering events (e.g. first triggering event). For example, the UE may evaluate or perform an evaluation based on one of the plurality of triggering events and subsequently determine that a connection to a wireless network is temporarily unavailable, and the wireless network being temporarily unavailable could be (associated with) one of the plurality of triggering events. In particular, the UE may also perform a quality of experience (QoE) evaluation for fulfilling a performance requirement. In step S203, the UE would transmit, after receiving the enable indicator, the first feedback signaling including a cause indicator which indicates a first triggering event of the plurality of triggering events in response to having determined that a first WLAN is temporarily unavailable. The cause could be a new cause or an updating cause from a previous cause. (In this example, the first trigger event indicated by the cause indicator could be 'busy medium'.) In step S204, the UE would maintain a current Long-Term Evolution (LTE)-WLAN (LWA) configuration (i.e. an aggregate configuration). Also in step S204, the UE would wait for a second configuration message in response to transmitting the first feedback signaling. The first feedback signaling may optionally include a capability indicator to indicate whether LWA configuration could be supported by the UE. The second configuration would provide further instruction as for how the UE would conduct uplink transmissions.

In one of the exemplary embodiments, the enable indicator further indicates that a second feedback signaling is to be transmitted in response to one of the plurality of triggering events. The second feedback signaling may include a second preferred configuration which may include one or a combination of a direction command, a status report, a measurement report, an updating cause, a preferred direction, a preference direction, and a preference indication. The second preferred configuration would be for the wireless connection. The wireless connection may include a licensed wireless connection and/or a licensed-assisted access connection. The UE would perform another evaluation to determine whether one of the plurality of triggering events has occurred. The connection to the first wireless network being available again could be another one of the triggering events to trigger the second feedback signaling (e.g. S405) after the connection to the first wireless network has previously been temporarily unavailable.

In one of the exemplary embodiments, the first configuration message may further include a status indicator which indicates that a status report is to be transmitted in response one of the plurality of triggering events to have occurred. The status report may include a buffer status report, a first wireless network status report, and a PDCP status report.

In one of the exemplary embodiments, the first configuration message may further include a measurement report is to be transmitted in response to any one of the plurality of triggering events. The measurement report may include a LTE measurement result, a first wireless network measurement result, and a configured RAT measurement result.

FIG. 2B illustrates a method of controlling configurable split bearer based on UE assisted feedback from the perspective of a base station. In step S211, the base station would transmit, via the transmitter, a first configuration message including an enable indicator which indicates that a first feedback signaling is to be transmitted in response to satisfying any one or a combination of a plurality of triggering events. In step S212, the base station would receive, after transmitting the enable indicator, the first feedback signaling including a cause indicator which indicates a first triggering event (e.g. 'busy medium') of the plurality of triggering events in response to having determined that a first WLAN is temporarily unavailable. In step S213, the base station would configure an updated Long-Term Evolution (LTE)-WLAN (LWA) configuration in response to receiving the first feedback signaling. In step S214, the base station would transmit a second configuration message including the updated LWA configuration. The second configuration would provide further instruction as for how a UE would conduct uplink transmissions.

Figures 2C, 2D:
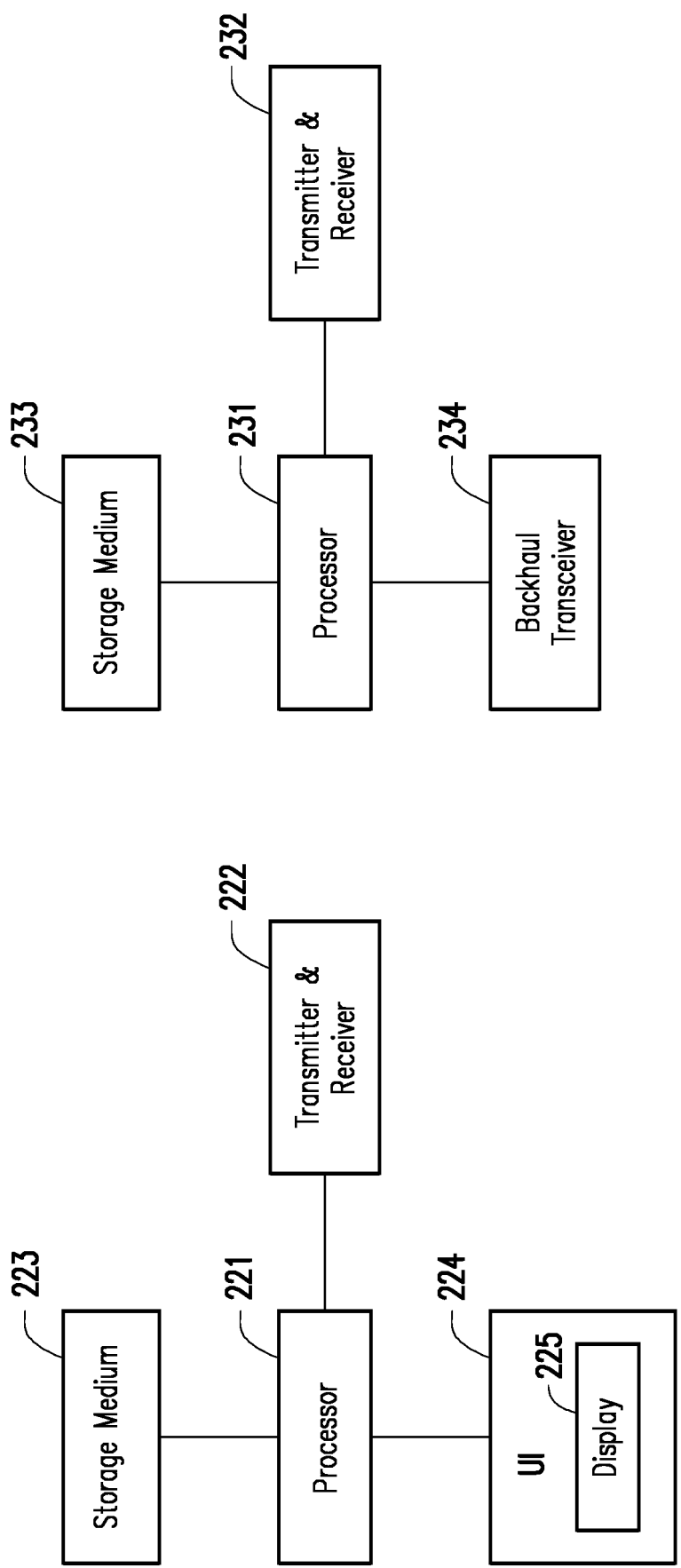
FIG. 2C illustrates the hardware diagram of a UE in accordance with one of the exemplary embodiments of the disclosure.
FIG. 2D illustrates the hardware diagram of a base station in accordance with one of the exemplary embodiments of the disclosure.

FIG. 2C illustrates the hardware diagram of a UE in accordance with one of the exemplary embodiments of the disclosure. The term UE in this disclosure could be a mobile station, an advanced mobile station (AMS), a server, a client, a desktop computer, a laptop computer, a network computer, a workstation, a personal digital assistant (PDA), a tablet personal computer (PC), a scanner, a (smart) telephone device, a watch, a pager, a camera, a television, a hand-held video game device, a musical device, a wireless sensor, a drone, and the like. In some applications, a UE may be a fixed computer device operating in a mobile environment, such as a bus, a train, an airplane, a boat, a car, and so forth.

The structure of the UE would include not limited to a processor 221 coupled to a transmitter and/or receiver (transceiver) 222, a storage medium 223, and optionally a user interface (UI) 224 which may or may not contain a display 225. The transmitter and/or receiver 222 are controlled by the processor 221 to down-convert radio frequency signals (RF) (or millimeter wave signals) received from an antenna (array) into baseband signals to be processed by the processor 221 and are controlled by the processor 221 to up-convert baseband signals into RF or millimeter wave signals to be transmitted through the antenna (array). The transmitter and/or receiver 222 may also include one or more sets of hardware tuned to different frequency bands such as RF frequency, millimeter frequency, Bluetooth frequency, WiFi frequency, and so forth. The storage medium 223 contains temporary and/or permanent storage medium for storage of temporarily buffered data or for permanent (non-volatile) data storage. The processor 221 would include one or more may include one or more hardware processing units such as processors, controllers, or discrete integrated circuits to implement the disclosed technique for controlling configurable split bearer based on user equipment (UE) assisted feedback.

FIG. 2D illustrates the hardware diagram of a base station (BS) in accordance with one of the exemplary embodiments of the disclosure. The term BS in this disclosure could be a variation or a variation or an advanced version of a 5G BS, macro cell BS, micro cell BS, pico cell BS, femto cell BS, "eNodeB" (eNB), a Node-B, an advanced BS (ABS), a base transceiver system (BTS), an access point, a home BS, a relay station, a scatterer, a repeater, an intermediate node, an intermediary, satellite-based communication BSs, and so forth.

The structure of the BS would include not limited to would include not limited to a processor 231 coupled to a transmitter and/or receiver (transceiver) 232, a storage medium 233, and a backhaul transceiver 234. The transmitter and/or receiver 232 are controlled by the processor 231 to down-convert radio frequency signals (RF) (or millimeter wave signals) received from an antenna (array) into baseband signals to be processed by the processor 231 and are controlled by the processor 231 to up-convert baseband signals into RF or millimeter wave signals to be transmitted through the antenna (array). The storage medium 233 contains temporary and/or permanent storage medium for storage of temporarily buffered data or for permanent (non-volatile) data storage. The backhaul transceiver 234 may include one or more transceivers (e.g. Si interface) for communicating with the core network and/or one or more inter-base station interfaces (e.g. X2) for communicating with another base station. The processor 231 would include one or more may include one or more hardware processing units such as processors, controllers, or discrete integrated circuits to implement the disclosed technique for controlling configurable split bearer based on user equipment (UE) assisted feedback.

Figure 3:
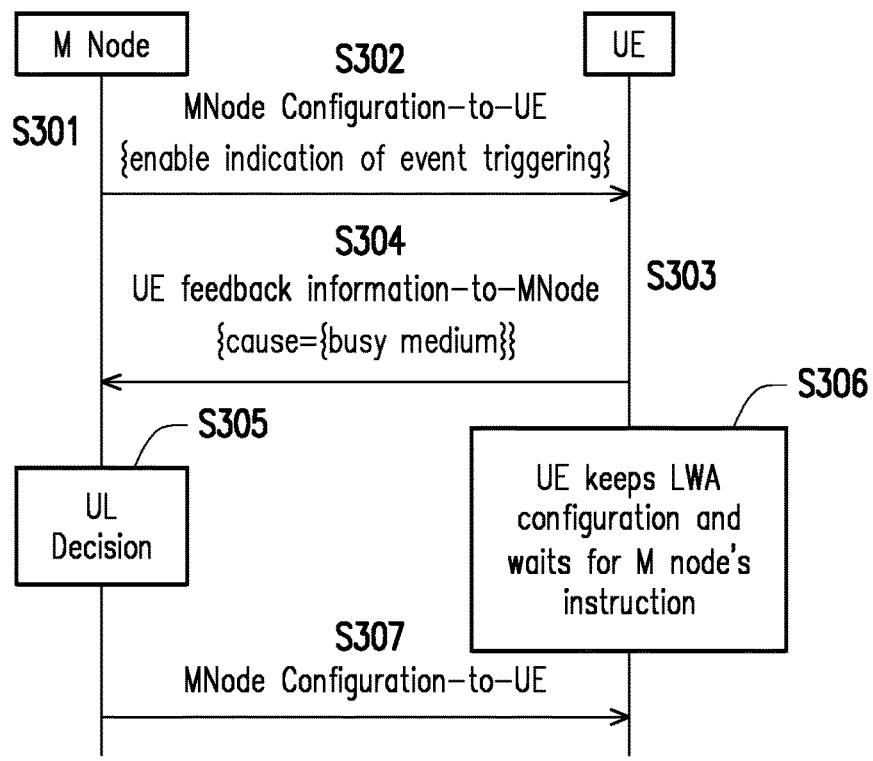
FIG. 3 illustrates a signaling diagram of controlling configurable split bearer based on user equipment (UE) assisted feedback in accordance with one of the exemplary embodiments of the disclosure.

The disclosure provides various exemplary embodiments to further elucidate the above described concepts as shown in subsequent figures and their corresponding written descriptions. FIG. 3 illustrates a signaling diagram of controlling configurable split bearer based on user equipment (UE) assisted feedback in accordance with one of the exemplary embodiments of the disclosure. In step S301, the M Node may determine whether to enable or suspend UE-assisted feedback mechanism for configuring the UL split bearer of a UE. The M node could be an eNB or a base station. Assuming that the M Node determines to enable UE-assisted feedback mechanism, in step S302, the M node would transmit to the UE a first MNode Configuration-to-UE message which may include not limited to an indicator which is enabled. The indicator may indicates whether UE may implement the UE-assisted feedback mechanism in response to the triggering of an event. In step S303, assuming that a serving WLAN for the UE has been temporarily suspended is one of the triggering events, and such event has been detected by the UE. In step S304, the UE would transmit to the M Node a UE feedback information-to-MNode message which may include not limited to a cause indicator. In this example, the cause indicator would indicate 'busy medium' which corresponds to one of the triggering event. In step S305, the M Node, would make the UL decision as for the UL direction of the UE which could be the LTE, another radio access technology (RAT) (e.g., WLAN or AP), or multiple RATs (e.g., both LTE and WLAN). In step S306, the UE would maintain the current LWA configuration (e.g., release/setup, WLAN IDs, parameters for authentication, parameters for WLAN status report, etc.) and wait for further instruction from the M Node during WLAN temporary suspension. In step S307, the M Node would transmit to the UE a second MNode Configuration-to-UE message which would include UL command for the UE which would then transmit UL data based on the UL command.

Figure 4:
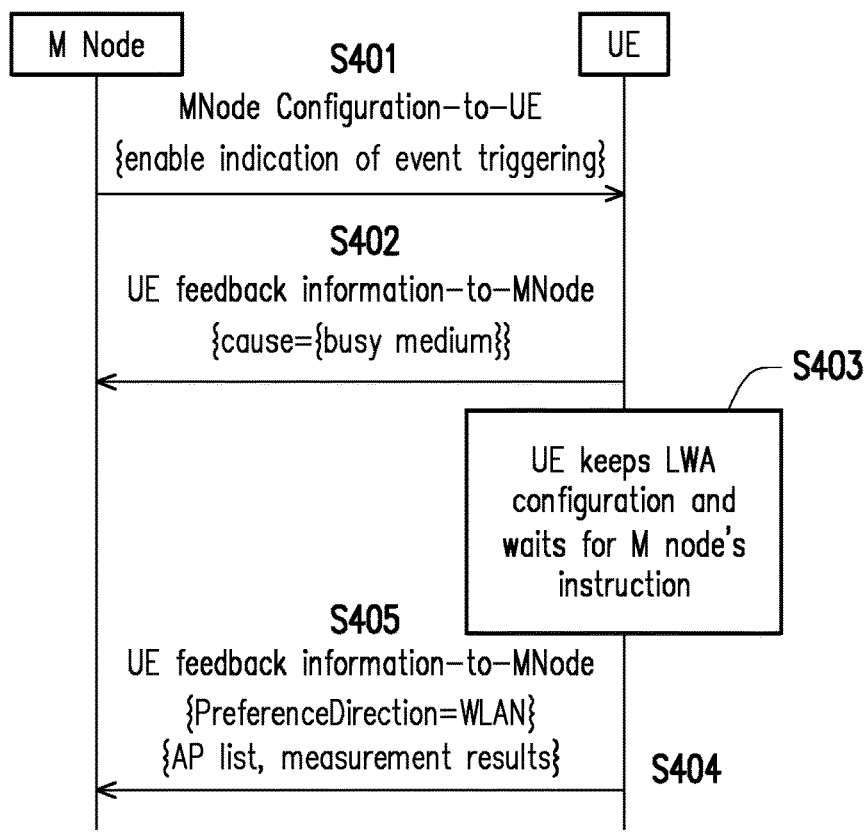
FIG. 4 illustrates a signaling diagram of controlling configurable split bearer based on user equipment (UE) assisted feedback in accordance with one of the exemplary embodiments of the disclosure.

FIG. 4 illustrates a signaling diagram of controlling configurable split bearer based on user equipment (UE) assisted feedback in accordance with one of the exemplary embodiments of the disclosure. In step S401, the M node would transmit to the UE a first MNode Configuration-to-UE message which may include not limited to an indicator which is enabled. The indicator may indicates whether UE may implement the UE-assisted feedback mechanism in response to the triggering of an event. Assuming that a serving WLAN for the UE has been temporarily suspended, in step S402, the UE would transmit to the M Node a first UE feedback information-to-MNode message which may include not limited to a cause indicator which would indicate 'busy medium'. In step S403, the UE would keep the current LWA configuration and wait for further instruction from the M node. In step S404, the UE has detected that the serving WLAN is available again before, and such event occur may occur before or after the UE receiving the second MNode Configuration-to-UE message (e.g. 307). In step S405, the UE may transmit a second UE feedback information-to-MNode message which may include not limited to any one or a combination of a preference direction indicator which indicates a preference direction of 'WLAN', an AP list, and measurement results which correspond to the APs of the AP list. Measurement results or measurement reporting from UE or S node may also include QoE metrics or application layer measurement reporting, e.g., user perceived throughput/quality, multimedia buffering time, preferred bit rate, web page download time, etc. QoE metrics for streaming QoE reporting may include Representation Switch Events, Average Throughput, Initial Playout Delay, Buffer Level, Play List, MPD Information, Playout Delay for Media Start-up, Device information, etc. Measurement reporting may be used for QoE Measurement Collection for Streaming or for quality estimation.

Figure 5:
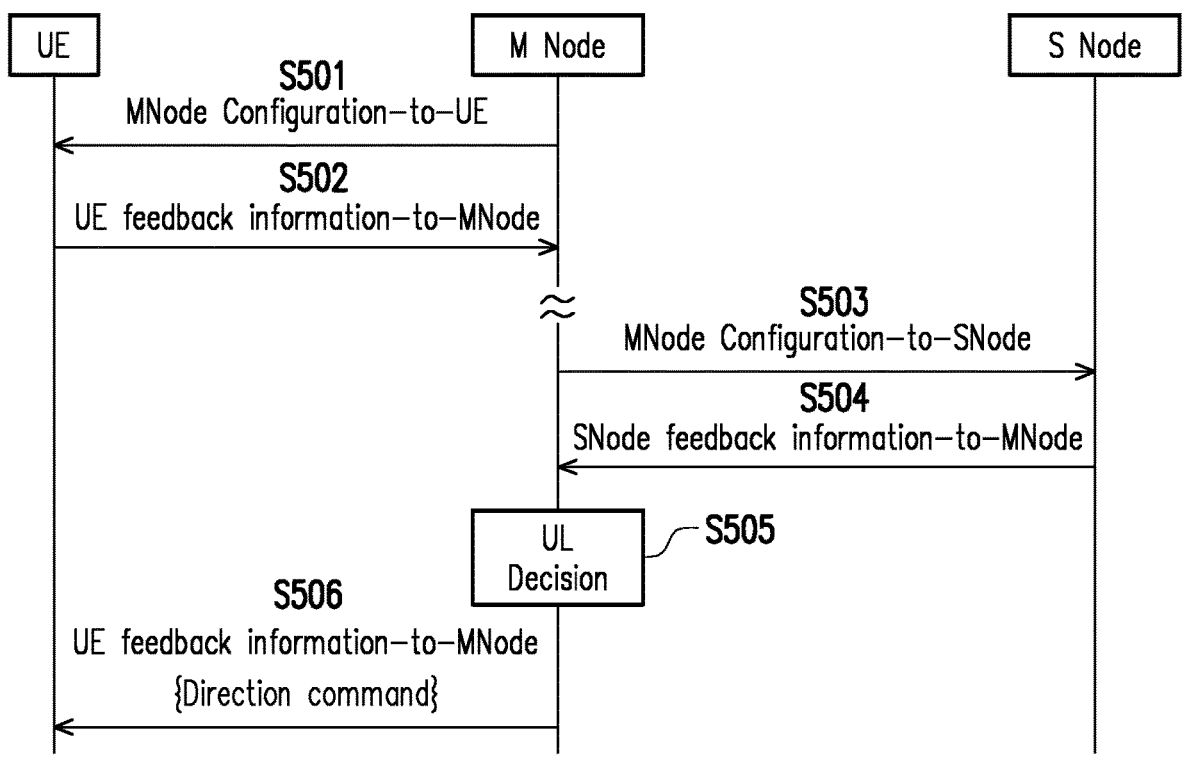
FIG. 5 illustrates a general message flow that may involve a M node (e.g. eNB) and a S node (e.g. WLAN) in accordance with one of the exemplary embodiments of the disclosure.

FIG. 5 illustrates a general message flow that may involve a S Node besides a M Node, and messages being transmitted may include a MNode Configuration-to-UE message, a UE feedback information-to-MNode message, a MNode Configuration-to-SNode message, and a SNode feedback information-to-MNode message. The order or the combination of messages is not limited to the presented embodiment. For example, the MNode Configuration-to-UE message (S501) may include one or more events for triggering BSR or measurement reporting, measurement configuration, BSR configuration, direction command or restriction, and etc. The MNode Configuration-to-SNode message (S503) may include a measurement request or inquiry. The UE feedback information-to-MNode (S502) message may include measurement results, BSR reporting, and etc. The SNode feedback information-to-MNode message (S504) may include measurement results which correspond to the request or inquiry of the MNode Configuration-to-SNode message (S503). The M node may make the UL direction according to received information from UE (e.g. S502) or from S node (e.g. 504). The UE may follow the direction command or routes as commanded and subsequently schedules data to the commanded direction.

A set of triggering events could be inherently configured within the UE or S node, and each of the triggering events would be inherently mapped to an event indicator. Each triggering event could be individually configured or enabled by the M node via means not limited to dedicated signaling or broadcast signaling.

Information carried by "UL Decision" from M node may include information (1) to determine UL direction decision, e.g., {LTE, WLAN, both}, AP ID, AP list, S node ID, another RAT, and so forth, (2) to request assistance information from UE or S node, e.g., measurement results, BSR, and so forth, and to calculate or to accumulate the number of indication from UEs or S node. Upon receiving configuration from M node, the UE may respond by the following not limited to any one or a combination of: (1) data scheduling or routing according to the received direction command, (2) detecting for triggering event and cause indicator transmission according to the UE detection, (3) reporting of BSR contents such as index, table, size level, and so forth, (4) configuration of BSR reporting such as periodical, event triggering, no reporting, and etc.

For example, a triggering event could be processed as follows. Based on UE's feedback information, the M node would likely be aware of UE's situation upon receiving such feedback information. The triggering event could be determined from direct reporting from the UE, the BSR, the measurement report, and so forth. Event triggering scenarios may include not limited to any one or a combination of traffic demand, busy medium (bad channel condition), preference direction, and traffic congestion. Feedback information from UE or S node may further include not limited to any one or a combination of Node ID, measurement results, BSR, and event indication. The M node may re-configure or update the UE, the serving node, or interfering/non-serving node by transmitting information not limited to any one or a combination of an AP ID, an AP list, a channel number, and a new traffic direction.

For example, each triggering event may be represented as measured, calculated, or quantized items in terms of different units for comparison, determination, or recognition. Triggering events may include not limited to any one or a combination of 'Traffic Demand', 'Busy Medium', 'Preference Direction', and 'Traffic Congestion'. Traffic demand could be determined based on buffered data in bytes which may be in UE buffer, PDCP buffer, RLC buffer, WLAN buffer, and etc. The traffic demand may also be determined from an index of range of buffered data or an indication of buffered-data explosion.

For example, assuming that an eNB configures a threshold of buffered data to be 3,000,000 bytes, then a UE would be triggered to feedback information if the UE's buffered data is 10,000,000 bytes which is over the threshold of 3,000,000 bytes.

For example, eNB may configure a threshold of increasing rate of buffered data, e.g., 30000 bytes/sec. UE will be triggered for feedback information if increasing rate of buffered data (e.g., 50000 bytes/sec) is over the threshold (i.e., 30000 bytes/sec).

For the event 'Busy Medium' which could also indicate 'bad channel condition' or "WLAN resource", such event could be determined at least from received signal strength indication (RSSI) in dBm, WLAN RSSI, a comparison of RSSI or channel occupancy rate (referring to LAA), data/decoding error rate, (MCS), CCA failure rate (the number of measured RSSI over a threshold within a time window), interference level, WLAN resource (e.g., hardware problem, sharing or occupancy), etc.

For example, an eNB may configure a threshold of RSSI, e.g., a power sensitivity level of −126 dBm. UE will be triggered for feedback information if a power sensitivity level is worse than −126 dBm during a time period such as 1 minute or for a comparison of a number threshold such 20 times per trial.

For example, the thresholds of interference level may be also set as "dBm" or level stages (e.g., several ranges of dBm). Therefore, the operation of comparison is to evaluate the measured output in terms of dBm with a threshold in terms of dBm. Thus, a UE will be triggered to feedback information if the measured interference level is over a threshold.

For example, an eNB may configure a threshold of CCA failure rate, such as 6 out of 10 trials within 2 minutes. A UE will be triggered to feedback information if the number of measured RSSI is over a threshold (i.e., CCA failure rate) (e.g., 8 out of 10 trials) within a time window (e.g., 2 minutes).

For example, the thresholds of data/decoding and channel occupancy rate may be also set as "percent" (%). Therefore, the operation of comparison is to evaluate the measured output in percentage with a threshold in percentage. A UE will be triggered to feedback information if the measured output is over a threshold.

For example, busy medium may also means hardware resource busy or hardware problems/issues (e.g., WLAN resource busy, shared baseband processor or antenna, etc.). WLAN resource busy may mean that hardware resource (e.g., WLAN module) performs background scanning or unknown WLAN activity, which is processed by operating system. WLAN module is occupied by other means temporarily for few seconds (e.g., TX/RX occupancy/duration or unknown period), so that the communication with WLAN may not be possible or unavailable temporarily. WLAN resource busy may mean that a micro transaction is executed in AP switch. The connection of WLAN may be lost for a short period. WLAN resource busy may also mean that a UE is configured with LAA operation while RF module or baseband processor is shared with WLAN (e.g., operating on the same or different frequency), so that the communication with WLAN may not be possible or unavailable temporarily, or LAA operation may not be possible or unavailable temporarily. Or, the simultaneous operation (e.g., limited buffer size, processing delay, hardware overheating) may degrade the performance (e.g., unsatisfied QoS). Hardware collision may cause the communication unavailable temporarily. Data transmission or reception may be suspended or stopped. For example, UE may not perform measurement, may discard measurement report, or may not report measurement results for the corresponding RAT or the related RATs. Measurement requirement (e.g., radio resource management, channel state information, etc.) may not be met for the affected frequency or component carrier if a hardware problem indication is triggered. Radio link monitoring may be suspended. eNB may be aware that measurement operation for the corresponding RAT is suspended due to the event of busy medium (e.g., hardware problem). eNB may disable or de-activate the corresponding RAT or the related RATs, and then may re-configure UE for S node connection or operation. The RAT may be LTE, WLAN, NR, etc.

For example, UE may evaluate a WLAN connection to all WLANs inside an AP list whether or not the connection to WLAN becomes temporarily unavailable. The triggering event 'Preference Direction' could be determined based on a change of preference direction. For example, assuming that '0' stands for preferring "LTE" and '1' stands for preferring "WLAN", the 'Preference Direction' event could be triggered if a UE reports '0' is preferred over the current direction of '1' or '1' is preferred over the current direction of '0'. For example, a bit steam may be used for RAT preference. Two bits denotes for LTE and WLAN. "11" denotes for a preference for LTE and WLAN. "01" denotes for a preference for WLAN, not LTE. "10" denotes for a preference for LTE, not WLAN. For another example, QoS is not satisfied so that a bear (e.g., bearer ID) should be re-mapping (e.g., the bearer should not be offloaded to WLAN) (e.g., the change of bearer type—split bearer or non-split bearer). UE may show the preference for which connection. The preference direction may cause the eNB or a related entity (e.g., the core network) to re-configure or to re-allocate a bearer (or a mapping flow) with a modification (e.g., updated mapping relation, QoS parameter/information, etc.). QoS information may include allocation and retention priority (ARP), Guaranteed Flow Bit Rate (GFBR)—UL and DL, Maximum Flow Bit Rate (MFBR)—UL and DL, 5G QoS characteristics—Resource Type (GBR or Non-GBR); Priority level; Packet Delay Budget; Packet Error Rate, Notification control (indicates whether notification to core network should be made if the QoS targets cannot be fulfilled for a GBR QoS flow during the lifetime of the QoS flow), etc. (e.g., the mapping relation—the mapping of flow and bearer). For example, hardware overheating (e.g., simultaneous operating on multiple RAT, high data rate m transmission and reception, high processor speed, etc.) may cause CPU throttling, under-clocking, thermal-throttling, processor speed throttling, processing delay, etc. The connection of WLAN may be suspended or unavailable temporarily. Consequently, QoS (e.g., bit error rate) or QoE may not be satisfied. The preference direction indication may show a preference to use either one RAT, not simultaneousness. For another example, a UE may express "busy medium" previously (e.g., WLAN resource), after a while (e.g., seconds), WLAN is available again. UE may show a preference for WLAN or for multiple RATs. So that, data transmission and reception may be resumed or re-stared.

The triggering event of 'Traffic Congestion' could be determined based on packet loss, error rate, dropping rate, buffer latency, CCA failure rate, and etc. For example, an eNB may configure a threshold of packet loss rate, e.g., 10% over 100 packets. A UE will be triggered to feedback information if the packet loss rate (e.g., 20%) is over the threshold (i.e., 10%). For example, the thresholds of error rate, dropping rate, buffer latency, and CCA failure rate may be also set as "percent" (%). Therefore, the operation of comparison is to evaluate the measured output in percentage with a threshold in percentage. For example, the eNB may configure a threshold of average buffer delay, e.g., 150 ms. The UE will be triggered for feedback information if the average buffer delay (e.g., 300 ms) is over the threshold (i.e., 150 ms). For example, traffic congestion may be resulted from WLAN resource or hardware problem, e.g., overheating, hardware sharing, operating system occupancy, processing delay, etc. The cause (e.g., hardware issues) may be included in the indication of events (e.g., traffic congestion). The indication may imply that measurement results in UE may not be available. UE feedback may include affected RATs. eNB may allow UE not to measure, or may configure UE not to measure affected RATs or frequency.

For example, if eNB receives the traffic congestion indication for hardware sharing between WLAN and LAA (e.g., RF module or antenna is shared), eNB may reconfigure TX/RX duration. For example, one period is used for WLAN operation and one period is used for LAA operation. Transmission/reception over WLAN may be unavailable temporarily due to LAA operation. In another case, eNB may reconfigure two RATs in different bands. For example, 2.4 GHz is used for WLAN, and 5 GHz is used for LAA. eNB may deactivate or release the affected RAT. For example, traffic is routed from WLAN to LTE. Shared hardware resource (i.e., WLAN resource or antenna) may be left for LAA operation.

Figure 6A:
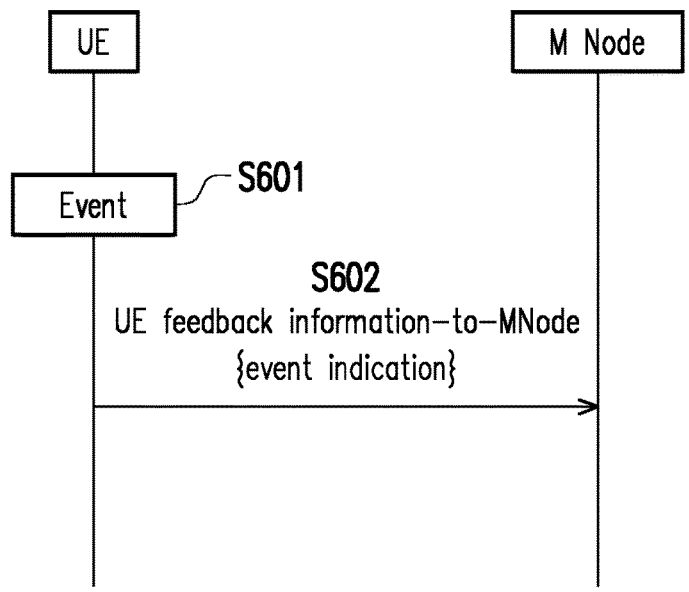
FIG. 6A illustrates a UE sending an event indication upon triggering one or more events in accordance with one of the exemplary embodiments of the disclosure.
Figure 6B:
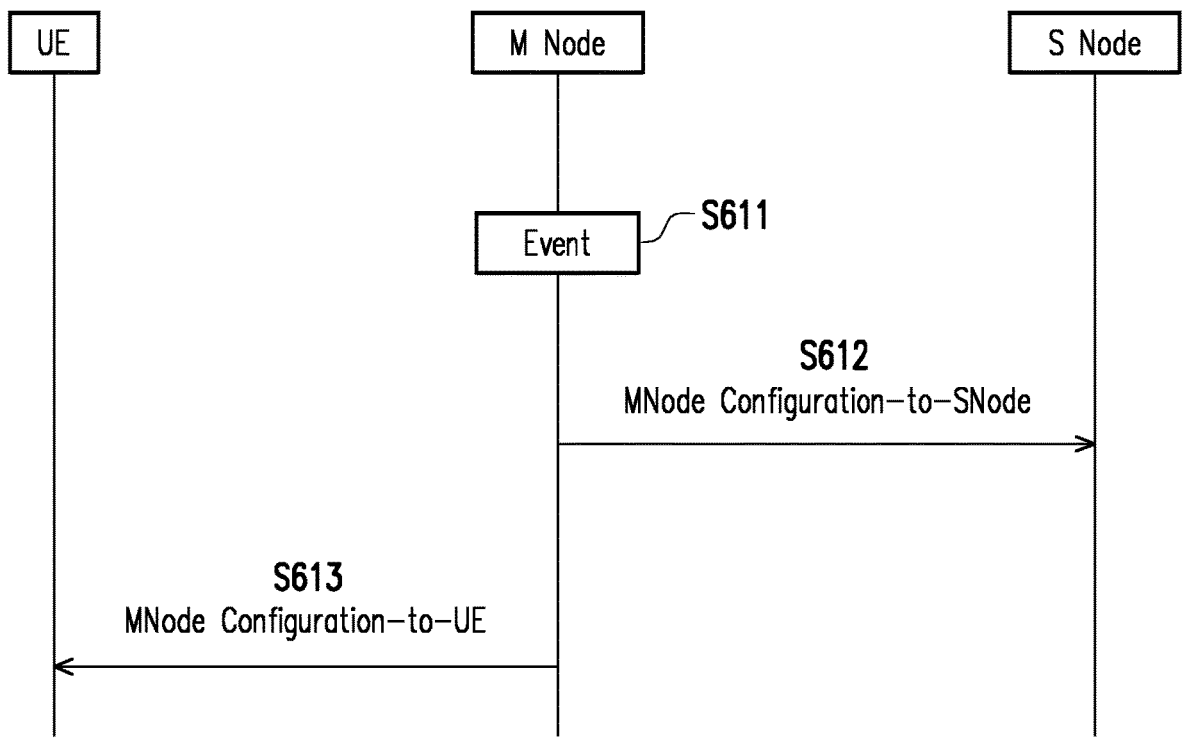
FIG. 6B illustrates a M node determining an event triggering in accordance with one of the exemplary embodiments of the disclosure.
Figure 6C:
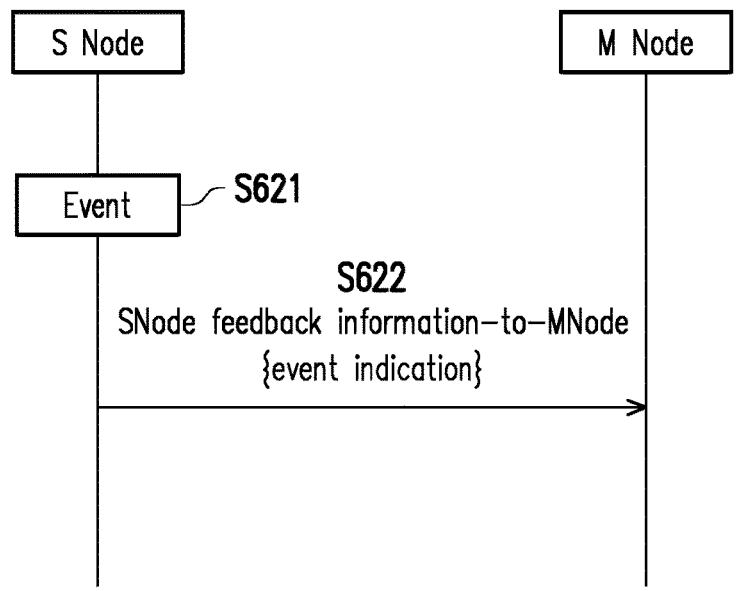
FIG. 6C illustrates a S node determining an event triggering in accordance with one of the exemplary embodiments of the disclosure.

In general, the M Node would transmit a configuration message to enable and configure UE feedback information which could be conveyed by using a feedback message that carries an 'event cause' indicator. The event cause is an indicator that indicates which one of the triggering events has been triggered. The event cause could be received and read by the M node which may then transmit a configuration message or a re-configuration message to UE or S node. Furthermore, a triggering event may also be detected by a S node which may then send a feedback message to the M node. FIG. 6A~FIG. 6C and their corresponding written descriptions provide exemplary embodiments to further elucidate the above described concept.

FIG. 6A shows an exemplary embodiment for which a UE may transmit an event cause when at least one triggering event transpires. In step S601, the UE may detect at least one triggering event which could be any one or a combination of the 'traffic demand', 'busy medium', 'preference direction', and 'traffic congestion'. In step S602, the UE may transmit a feedback information-to-MNode message to the M Node which could be an eNB or macro cell base station. The feedback information-to-MNode message may include not limited to an event cause indicator which indicates and corresponds to the one triggering event that has been triggered. In response to the detection of a triggering event, the feedback information-to-MNode message may further include not limited to any one or a combination of a BSR and measurement results including signal strength and/or quality from the M node/LTE cell, from a S node/WLAN, from any source from an unlicensed spectrum, and etc.

For the exemplary embodiment of FIG. 6B, in step S611 the M Node may detect at least one triggering event which could be any one or a combination of the 'traffic demand', 'busy medium', 'preference direction', and 'traffic congestion'. In step S612, the M Node may transmit a MNode Configuration-to-SNode message to a S Node. The S Node could be a WLAN or an AP. In step S612, the M Node may transmit a MNode Configuration-to-UE message to a UE. The MNode Configuration messages in step S612 and S613 may further include any one or a combination of an event cause indicator, an inquiry information (e.g., BSR, PDCP sequence, UE capability), and a new configuration which may include information such as a node ID, a channel number, and beam information. The inquiry information may include "Report UE temporary category/capability" or "Assistance information for parameter re-configuration". For example, if the M Node receives the event indication or the measurement results (e.g., feedback of the inquiry information), M node may re-configure S node or UE, e.g. reduced number of activated component carriers, reduced MIMO layer capability, reduced modulation order of the UE is supported, etc.

For the exemplary embodiment of FIG. 6C, in step S621, the S Node may detect at least one triggering event which could be any one or a combination of the 'traffic demand', 'busy medium', 'preference direction', and 'traffic congestion'. In step S622, the S Node may transmit a SNode feedback information-to-MNode message to the M Node which could be an eNB or macro cell base station. The SNode feedback information-to-MNode message may include not limited to an event cause indicator which indicates and corresponds to the one triggering event that has been triggered. In response to the detection of a triggering event, the feedback information-to-MNode message may further include not limited to any one or a combination of a BSR and measurement results including signal strength and/or quality from the M node/LTE cell, from a S node/WLAN, from any source from an unlicensed spectrum, and etc.

Figure 7:
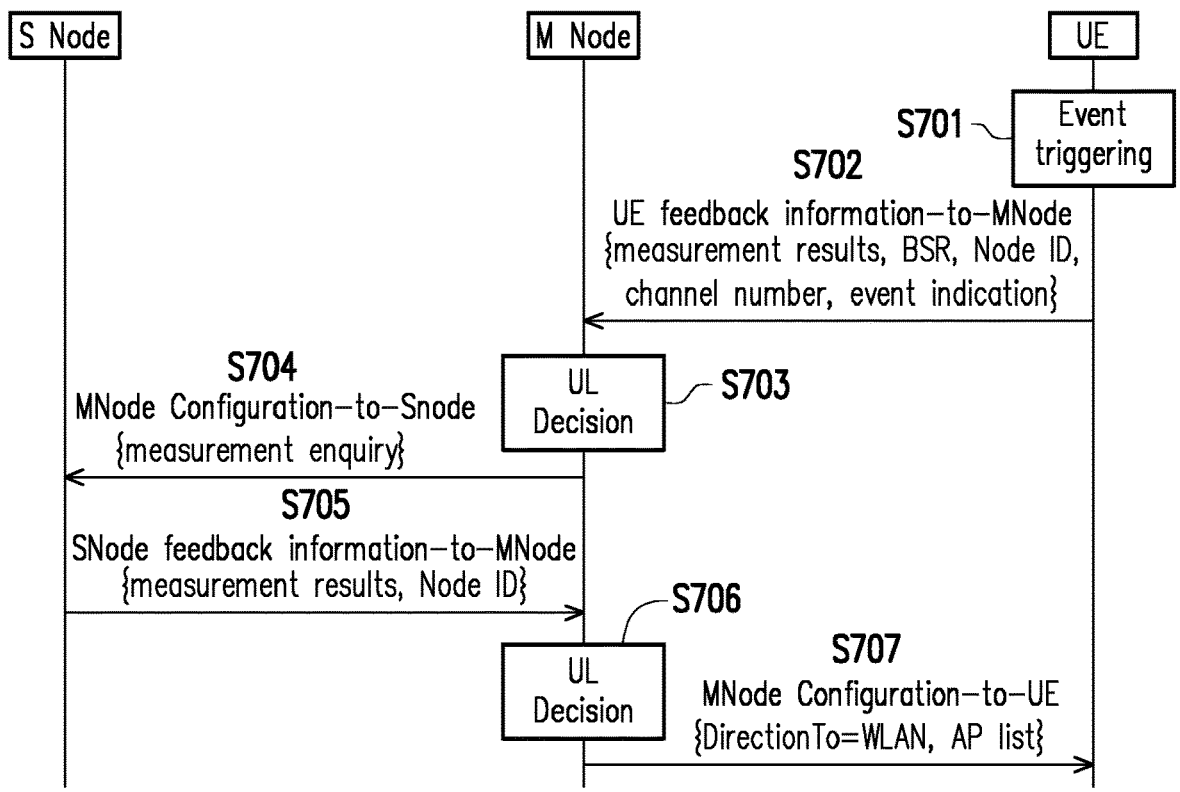
FIG. 7 illustrates a M node collecting UE's feedback information to re-configure a S node in accordance with one of the exemplary embodiments of the disclosure.

FIG. 7 is an exemplary embodiment which expands upon the exemplary embodiments of FIG. 6A~FIG. 6C. In step S701, the UE would determine whether a triggering event has occurred by performing measurements or by detecting such event. For example, if UE has detected a buffered-data explosion within a time period, the UE would respond dynamically by transmitting a feedback message. In step S702, the UE would transmit to an M Node a UE feedback information-to-Mnode message which may include not limited to any one or a combination of a measurement result, a BSR, a Node ID, a channel number, and an event cause indicator. By doing so, the UE may inform the M Node that the current service quality has fallen short of an expected standard via measurement results or BSR. The UE feedback information-to-Mnode message may further include a bad signal strength/quality indicator, a low average throughput indicator, a failure to transmit indicator (e.g., temporarily unavailable), and etc. In step S703, in response to receiving the information conveyed from the UE feedback information-to-Mnode message, the M node would take such feedback information into account and make decision to improve the service quality (e.g., bearer type change, flow-bear mapping, QoS remapping, etc.) to the UE. However, before doing so, the M Node may require assistance from the S Node. Also, the M Node may want to re-configure the S Node. By using the BSR, the M node would be aware of an amount of data stored in the UE due to the LWA configuration with the S node.

In step S704, the M Node would transmit a MNode Configuration-to-Snode message which may include not limited to any one or a combination of a measurement inquiry and a channel number which may help the UE to resolve stalled LWA UL transmission. The measurement inquiry may include information such as a channel condition and internal situation of the WLAN or the AP. In step S705, the S node may transmit to the M Node a SNode feedback information-to-MNode message which may include not limited to a measurement result and/or a node ID. After receiving the feedback information from the UE and/or the S node, in step S706, the M node would re-configure the uplink split bearer of the UE. In step S707, the M Node would transmit to the UE a MNode Configuration-to-UE message which may include not limited to any one or a combination of a direction command ('DirectionTo') and an AP list. For example, if the S Node is completely inaccessible, the direction command could be DirectionTo=LTE. For example, if connect to the S Node is selected by the M Node, the direction command could be DirectionTo=WLAN. The S node is not limited to WLAN but could be any other types of apparatuses that m service wireless connections.

Figure 8:
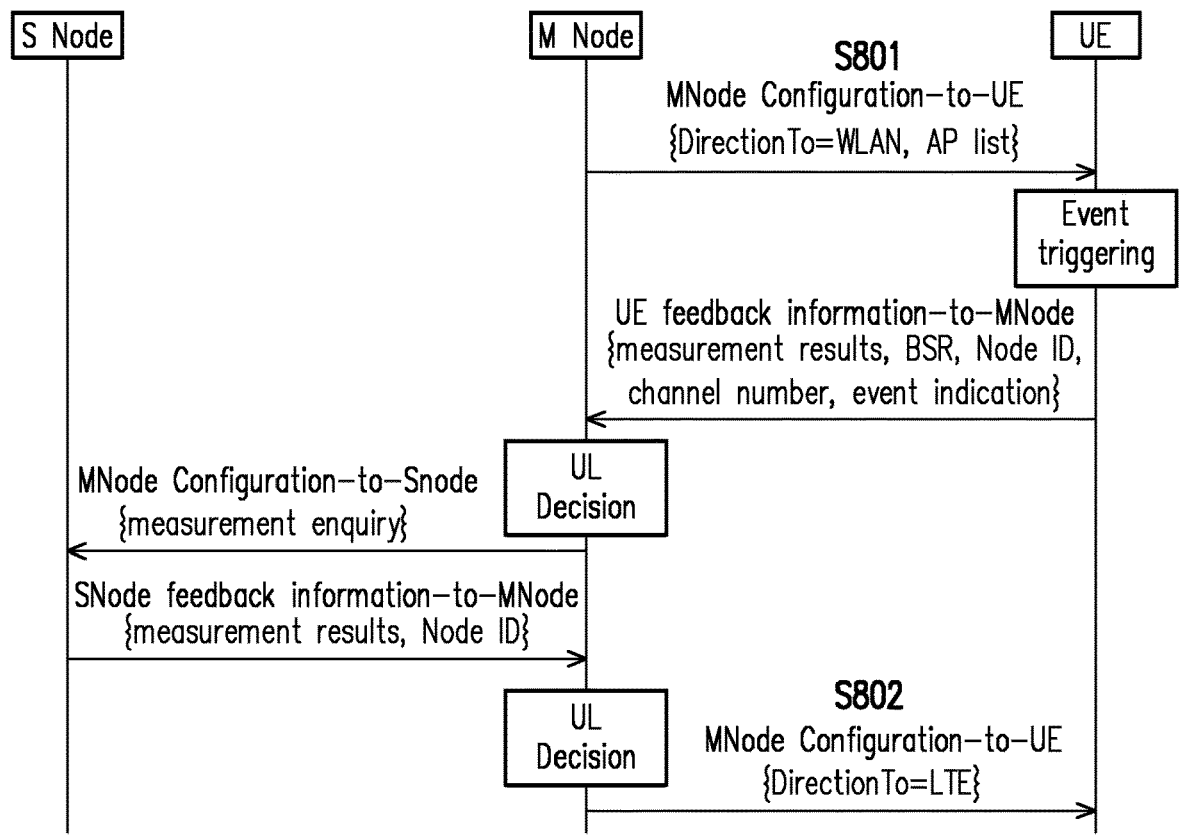
FIG. 8 illustrates a M node changing UL direction in accordance with one of the exemplary embodiments of the disclosure.

The exemplary embodiment of FIG. 8 is similar to the exemplary embodiment of FIG. 7 except for steps S801 and S802. In step S801, the M Node may transmit a MNode Configuration-to-UE message which may include not limited to any one or a combination of a direction command and an AP list. For example, the direction command could be used to configure a default UL direction as 'DirectionTo=WLAN'. After gathering information from UE and S Node, in step S802, the M Node may transmit a MNode Configuration-to-UE message which may change the UL direction to 'DirectionTo=LTE'. The change could be due to a triggering event.

For example, the trigger event could be 'traffic demand'. If UE buffered data assumed to be 10,000,000 bytes which far exceeds a highest allowable buffer size level of 3,000,000 bytes for a BSR, then such circumstance would trigger the event of 'traffic demand'. The M node may then suggest the UE to route traffic to another S Node such as WLAN, higher frequency node, NR node, LAA node, and etc. Measurement results may be required from UEs or S node which may then transmit an event cause indicator from a UE or S node. Such event would be considered as the first event or a single event.

For example, the UE may have a UL service with high data rate requirement. However, the signal strength/quality of WLAN link (2.4/5 GHz) may still be good enough. Periodic BSR may indicate a higher level of buffer size, and such event could be considered as a high priority in BSR reporting. When such event occurs, the M node may determine the UL direction as 'DirectionTo=LTE', or the UE direction could be set as both 'DirectionTo=LTE' and 'DirectionTo=WLAN' if the M node is uncertain whether it could process the high demand of the UE.

If a new event indication is enabled, especially for a particular service (e.g., AR/VR), the M node may be able to make a better decision. For example, a 60 GHz WLAN AP/an AP List could be provided to the UE. Wide bandwidth and high data rate may be enjoyed, but the LTE service of the M node may be not necessarily reserved for the UE. Furthermore, the M node may analyze whether or not a triggering event is a single event. If the triggering event is a single event, the M node may just provide a better or more suitable WLAN or AP, e.g., 60 GHz WLAN. If there are multiple triggering events, the M node may need to consider feedback information from both UEs and the S node. For example, (1) when a group of UEs is attached to a particular AP which may then encounters overloading problems. The M node may then configure potential APs in an AP list for each of the UEs to balance AP loading. (2) A particular service requirement could be needed. The M node may assist the UE to use a particular WLAN/AP. In a long-term perspective and system maintenance, the M node should be aware of the reason or cause as for why BSR level increases and make an appropriate decision about UL direction instead of trial and error.

Figure 9A:
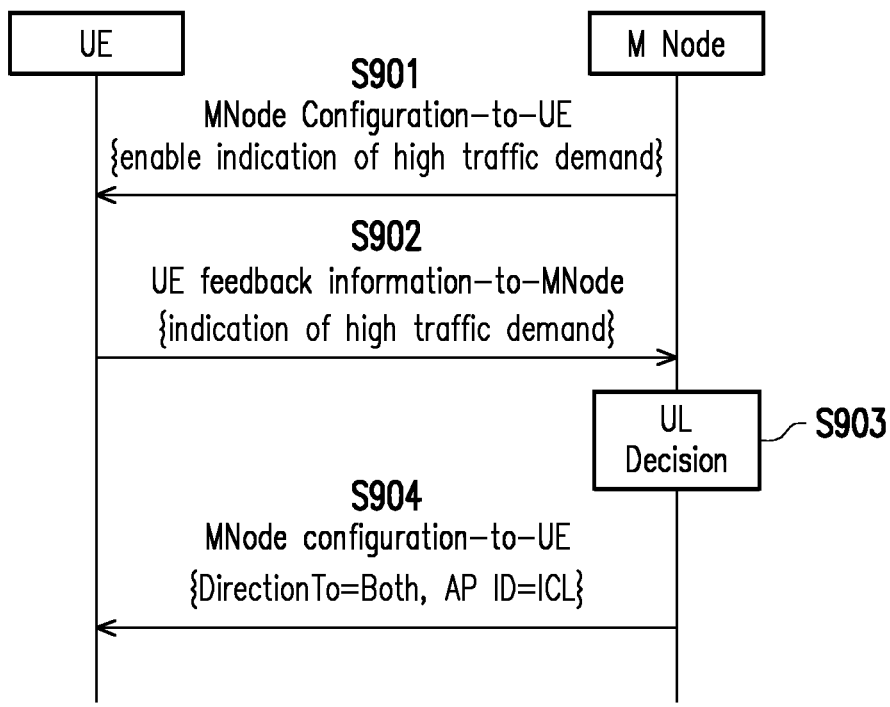
FIG. 9A illustrates a M node enabling a UE to feedback an indicator which indicates high traffic demand in accordance with one of the exemplary embodiments of the disclosure.

The M Node may enable the UE to transmit feedback information based on only a specific triggering event. In FIG. 9A, the M node in step S901 transmit a MNode Configuration-to-UE message to enable UE to transmit feedback information in response to a high traffic demand being encountered. Upon encountering a high loading or a high traffic demand, in step S902, the UE may transmit a UE feedback information-to-MNode message to inform of M Node of such triggering event. With assistance from the UE, in step S903, the M node may provide a direction command and related information to mitigate or solve UE's problem by re-configuring the UL of the UE. Thus, in step S904, the M Node would transmit a MNode Configuration-to-UE message which may, for example, set 'DirectionTo=Both' (i.e. both LTE and WLAN split bearers would be used) and AP ID=ICL.

For example, the M node in the MNode Configuration-to-UE message may indicate a specific AP ID in an AP list. If needed, the M node may indicate a 60 GHz WLAN (e.g., AP ID) in the AP list, or M node may provide more specific AP information such SSID or BSSID or HESSID name in the same or in a separate AP list.

For example, the M node in the MNode Configuration-to-UE message may provide a direction command, including DirectionTo=WLAN and AP list. However, if the UE is not satisfied with the UL direction or the configuration upon using S node/AP, the UE may communicate such unsatisfied experience to the MNode. Upon receiving the event cause indicator which indicates such unsatisfied experience, the M node may seek another S node for help if necessary. The M Node may then configure a different S node to the UE or a list of APs for the UE to choose from. The M node may accordingly modify the UL direction of the UE via the MNode Configuration-to-UE message of step S904.

Figure 9B:
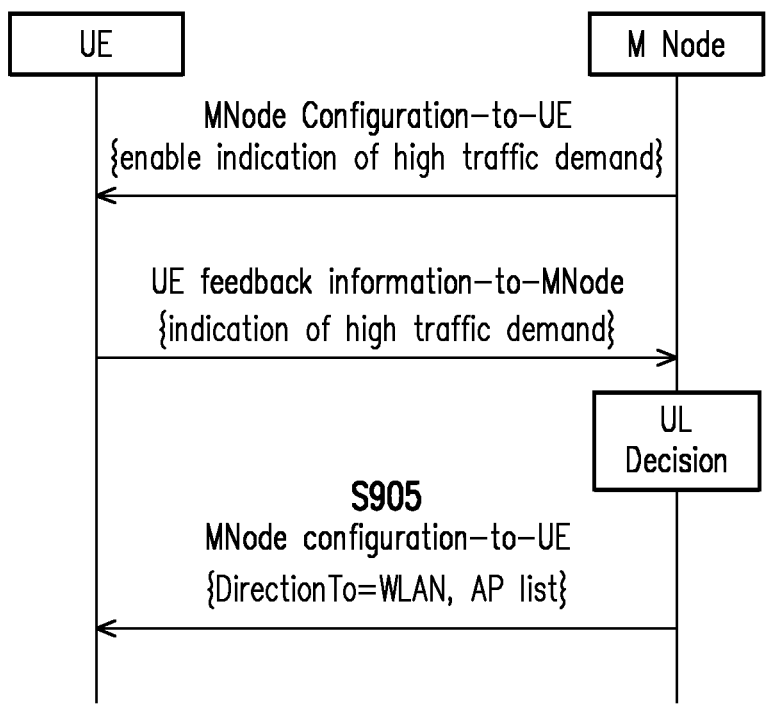
FIG. 9B illustrates a M node resolving a problem on its own in accordance with one of the exemplary embodiments of the disclosure.

The M Node may also resolve the issue of a trigger event without UE's assistance. For the exemplary embodiment of FIG. 9B, the UE may transmit the UE feedback information-to-MNode to only contain the event cause indicator. Upon determining the trigger event from the event cause indicator, the M node would solve the problem by its own without other information from the UE to assist the troubleshooting. In step S905, if a list of S node ID (e.g., AP list) is provided in the MNode Configuration-to-UE message, M node would thus indicate the UE to route traffic to another node or cell or beam.

Figure 10:
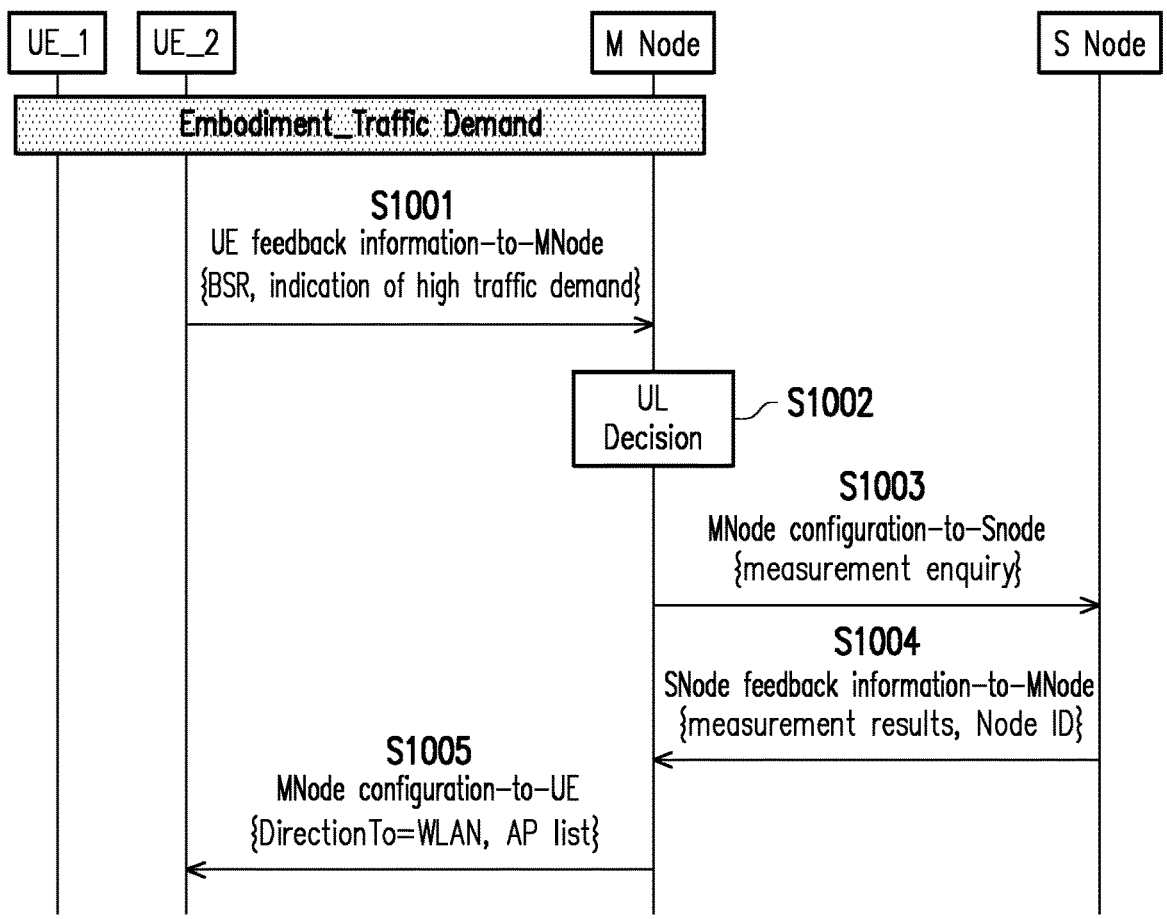
FIG. 10 illustrates a M node selecting a S node for a UE in accordance with one of the exemplary embodiments of the disclosure.

For the exemplary embodiment of FIG. 10, the M node would select a S node (e.g. WLAN/AP) to service the UE. The M node may collect feedback information from one or multiple UEs in order to re-configure the current S node or a new S node to the UE. The M node may need measurement results from the UE or from the current S node. The M node may then re-configure the UE to route traffic to another S Node such as a WLAN, a higher frequency node, a NR node, a LAA node, and etc.

Referring to FIG. 10, UE_1 may transmit a UE feedback information-to-MNode message which may include not limited to an event cause indicator which indicates the triggering event of 'traffic demand'. Within a predetermined time period, UE_2 may also transmit a UE feedback information-to-MNode message (S1001) which includes not limited to an event cause indicator which indicates the triggering event of 'traffic demand'. In step S1002, the M node may make a UL decision for UE_1 and UE_2 upon receiving the feedback information from the UEs as previously described embodiments. Alternatively, the M node may make the UL decisions after collecting more information from the same UEs or other UEs within a predetermine time duration (threshold_1, e.g., 10 seconds). M node may need to determine whether the feedbacks indicate a single trigging event having a common cause or multiple events having different causes. Also, from the feedback information, the M node may determine whether the event(s) are actually caused by the serving AP(s). In order to do so, the M node may need to calculate or to accumulate information from a number of event cause indicators not only from UE(s) but also from S node(s). In step S1003, the M node may then transmit a MNode Configuration-to-Snode message which may include a measurement inquiry to an S node for further information. Upon receiving the SNode feedback information-to-Mnode in step S1004, the M node may determine a solution not limited to providing a direction command and related information, e.g., DirectionTo=WLAN and AP list to one or more UEs by transmitting a MNode configuration-to-UE message in step S1005.

For example, the M node may receive event cause indicators from the same or different UEs, e.g., M node receives an event cause indicator from UE_2 after receiving an event cause indicator from UE_1 within a predetermined time window. The number of event cause indicators received by the M node may need to exceed a threshold (e.g., 10 times). The M node may request feedback information from UE or S node before making UL decisions. For example, due to UE's problems, the M node may reserve more WLAN resources, to change UL directions, or to indicate AP ID for a specific UE. Due to S node's problems, the M node may have to change UL direction or to change the AP list for the UEs.

In the event of 'busy medium' or bad channel condition, for example, a UE may have difficulties decoding data as error rate of received data might be high. Such problem could be caused by an event such as channel fading, interference, atmospheric absorption, and etc. The M node may assist the UE to resolve decoding difficulties (e.g., temporarily unavailable in WLAN module or transmission/reception) by modifying configurations of any one or a combination of a non-serving S node, a TX/RX opportunity/duration (e.g., the availability of WLAN module of AP or UE), a new configuration with AP ID, a channel number, and so forth. An AP may be a node having a specific frequency, channel, bandwidth, beam, sector, geo-location, and etc.

The triggering event of 'busy medium' or bad channel condition may need further WLAN measurement results in order for a UE to determine whether to transmit a feedback information having such triggering event to the M Node. For example, a UE may experience bad data transmission/reception due to 'busy medium' or bad channel condition as the results of interference, pathloss, bad channel condition, or hardware issues. Even though the CCA failure rate as measured by RSSI over a threshold may increase, the WLAN/S node RSSI or signal strength might still good. Under such circumstance, WLAN measurement report may not be triggered.

For another example, the BSR level of a UE may increase slowly when the UE is served by a particular S node, but the M node may not be aware of the situation. In fact, the M node might not be having any issue with the S node. Therefore, the M node may not take any action. If a triggering event indicator is enabled, the M node may be aware of such problems which may further include, for example, (1) hidden node problem as the M node may change or modify channel number or WLAN/AP and (2) problems suffered by multiple UEs. The M node may calculate or analyze the triggering event indicators from the UE or the S node. If the problem of BSR level increase is caused by a particular AP, then the AP ID could be excluded from the AP list currently configured for the UE.

If a group of UEs are provided with the same S node/AP list, the M node may provide a different S node list or AP list to different UEs. For example, based on UE's feedback information, the M node could be aware that the UE suffers interference upon transmitting or receiving. UE may then further include information of known interfering node to M node by providing a Node ID of the interference node. The M node may then re-configure interfering/non-serving node by means such as assigning a different channel number for interfering node to use.

Figure 11:
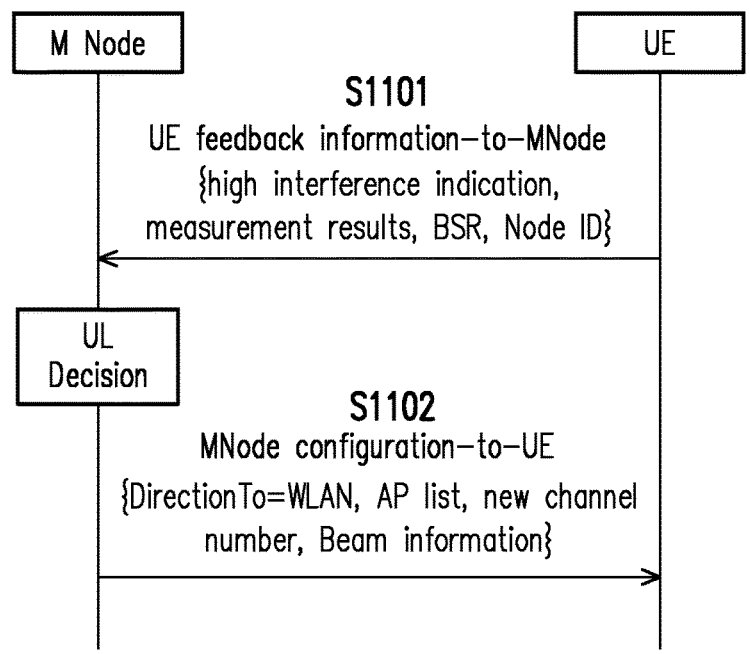
FIG. 11 illustrates a M node resolving a problem on its own in accordance with one of the exemplary embodiments of the disclosure.

For the exemplary embodiment of FIG. 11, the M node may attempt to solve the problems by its own accord. Upon encountering 'busy medium' or bad channel condition, in step S1101, UE may inform such triggering event to the M node by transmitting a UE feedback information-to-MNode message which may further include any one or a combination of WLAN unavailable time (e.g., several seconds or TX/RX opportunity/duration), measurement results, BSR, interference level, and node ID. It may imply that WLAN module is temporarily unavailable. The M node may wait a period to provide a reconfiguration. The M node may consider this feedback information to make a UL decision which may include re-configuring an UL direction of a UE. From the UE feedback information-to-MNode message from the UE, in step S1102, the M node may transmit a MNode Configuration-to-UE message which would provide a direction command e.g., DirectionTo=WLAN and AP list as well as related information such as channel number and beam information.

The triggering event indicator may also indicate 'high interference', 'busy medium', 'WLAN busy medium', 'bad channel condition', 'high error rate', or other settings (e.g., QoS/QoE dissatisfaction, hardware issues/problems, hardware sharing, hardware overheating, performance increase/decrease, etc.) in the following embodiments.

For example, beam information referring to IEEE 802.11ad/ax/ay may include: (1) discovery information including a configuration of beacon interval in terms of time units, (2) feedback information for coarse beam training including countdown indication, sector ID, antenna ID, codebook, index of codebook, weight vectors (in digital or analog domain), antenna pattern, antenna configuration, antenna port layout, antenna array model, slot selection in association beamforming time for beamforming training, and etc., where ID may be a number, sequence, code, name, pattern, index, and etc., (3) antenna configuration which could be for fine beam training including beam ID, codebook, index of codebook, weight vectors (in digital or analog domain), etc., and (4) transmission configuration including channel ID, MCS index, indicator of scheduled access (including service period), or contention access service period (including contention period) for TDMA or spatial reuse.

Figure 12:
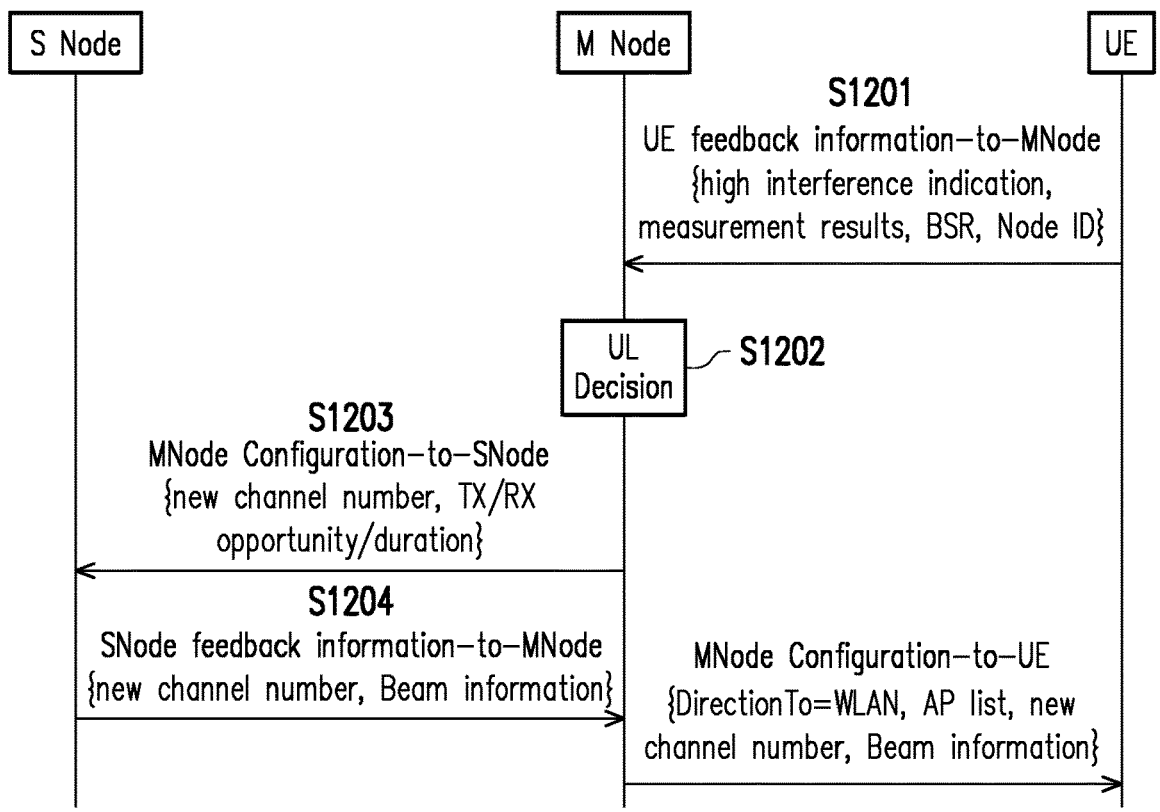
FIG. 12 illustrates a M node requiring S node's assistance in accordance with one of the exemplary embodiments of the disclosure.

FIG. 12 shows an exemplary embodiment in which the M node would require assistance from the S node. For this exemplary embodiment, the UE is assumed to experience difficulties such as high error rate in decoding data, and the difficulties could be caused by a number of possibilities including channel fading, interference, atmospheric absorption, and etc. The M node would resolve UE's decoding difficulties by modify configuration of non-serving S node or by modifying the TX/RX opportunity/duration of S node or UE. The measurement results from UE may further include a new channel number.

Referring to FIG. 12, in step S1201, the UE may transmit to the M Node a UE feedback information-to-MNode message which may include one or a combination of an event cause indicator which indicates 'high interference', measurement results, BSR, and Node ID of the serving S Node. In step S1202, may determine to delegate the task of resolving UE's difficult to the S node. In step S1203, the M node may transmit a MNode Configuration-to-SNode message which may include at least one or a combination of a new channel number, a TX/RX opportunity or duration. In step S1204, the S node would transmit a SNode feedback information-to-MNode message which may include any one or a combination of a new channel number and beam information. In step S1205, the M node would transmit to the UE a MNode Configuration-to-UE message which may include any one or a combination of DirectionTo=WLAN, an AP list, a new channel number, and beam information.

Figure 13:
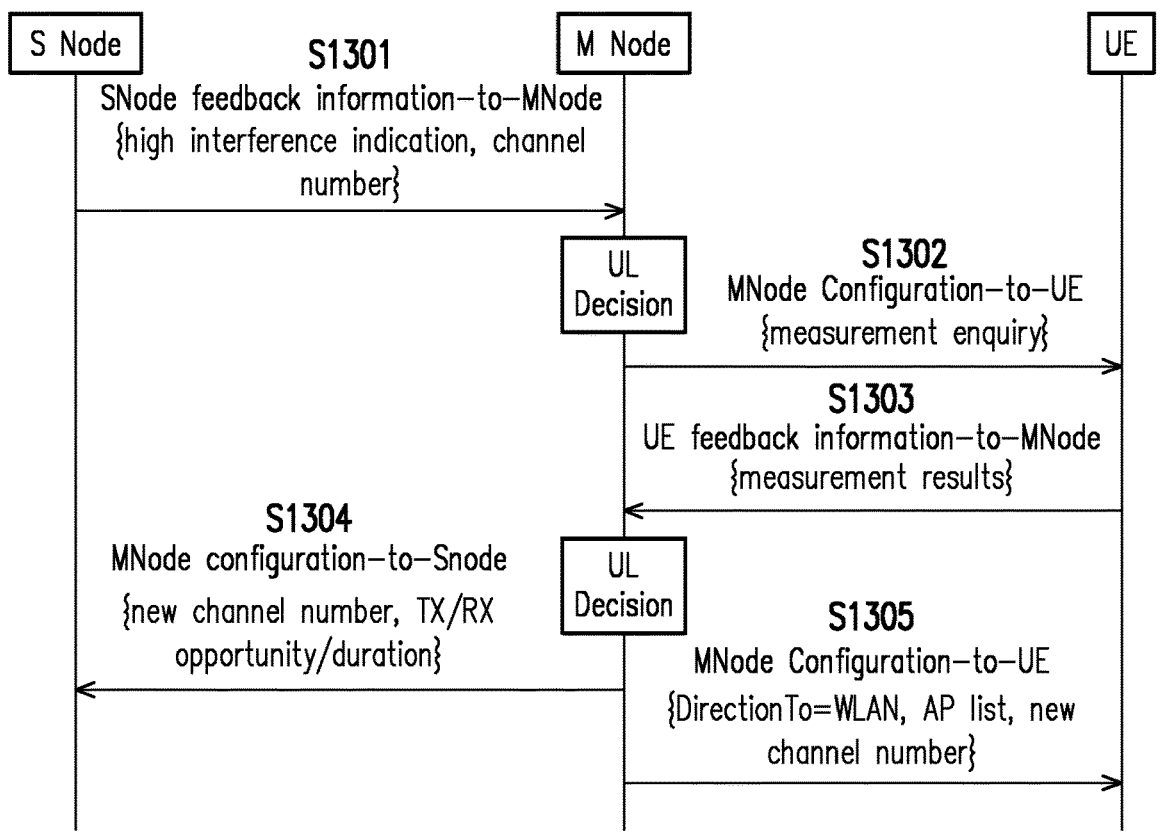
FIG. 13 illustrates a M node collecting feedback information from S node or UE to re-configure the S node in accordance with one of the exemplary embodiments of the disclosure.

For the exemplary embodiment of FIG. 13, the M node would collect feedback information from S node or UE in order to re-configure S node which could be a serving or non-serving S node. For example, in step S1301, the M node may receive a triggering event from S node via a SNode feedback information-to-MNode message which may include any one or both of an event cause indicating 'high interference' and a channel number which denotes the channel being interfered with. For example, S node may be temporarily unavailable. In step S1302, the M node may inquire whether a UE also encounters the same problem and may inquire assistance from the UE by means such as obtaining a measurement result by transmitting a MNode Configuration-to-UE message. After gathering feedback information from a UE feedback information-to-MNode message in step S1303, the M node may determine and subsequently m transmit to the UE in step S1305 a MNode Configuration-to-UE message which may include any one or a combination of a UL direction (e.g. DirectionTo=WLAN), a new channel number, a TX/RX opportunity/duration, an AP list. In step S1304, the M node may transmit a MNode Configuration-to-Snode message which may include any one or a combination of a new channel number, a TX/RX opportunity or duration to the S node.

In another exemplary embodiment, the S node may be aware of high interference by its monitoring or measurements. The S node may further modify the WLAN resource (e.g., channel) to avoid the interference. The S node may further inform the M node of such problem, and then the M node may request UEs for measurements to identify the problem. The M node may need to collect or retain feedback information from the S node or the UEs within a time duration to be able to solve the problem immediately.

The following disclosure would provide examples of a M node receiving a preference direction. A UE may transmit a preference of UL direction to the M Node. Preference direction may further include a preferred cell, a preferred beam, a preferred S node/AP, and etc. based on increased WLAN usage opportunity and efficiency. Upon receiving the triggering event of a preference direction change, the M node may need more feedback information in order to provide suitable configuration to the UE or the S node. For example, the M node may request from the UE or the S node measurement results which may include any one or a combination of WLAN RSSI, AP loading, channel utilization, estimation data rate, interference level, and bandwidth. For LTE cellular communication, the measurement results may include any one or a combination of RSSI, RSRP, RSRQ, interference level, and bandwidth.

WLAN measurement results may include any one or a combination of Beacon RSSI, WLAN RSSI, RSSI, DL/UL backhaul rate, estimated throughput, and 802.11 metrics (as described in 3GPP R2-142731). The 802.11 metrics may include any one or a combination of received channel power indicator (RCPI), received signal to noise indicator (RSNI), average noise power indicator (ANPI), Channel Load, Basic Service Set Identifier (SSID), basic service set (BSS) Load, BSS Avg Access Delay, BSS Access Controller (AC) Access Delay, BSS Available Admission Capacity, Noise Histogram, Tx/Rx Frame Count, QOS Tx/Rx Frame Count, frame check sequence (FCS) Error Count, Retry Count, Retry a MAC service data unit (AMSDU) Count, Supported Operating Classes, BSS Description, Roaming Consortium, network access identifier (NAI) Realm, 3GPP Cell Network, Capability Lists, wide area network (WAN) Metrics, and station (STA) Capabilities.

In one exemplary embodiment, a UE may choose its own preference, and the M node would go with the UE's preference. Therefore, the M node would need to first enable the feedback of such triggering event indicator for the UE to communicate its preference for the UL direction. The preference of UL direction may also be modified according to UE's future decisions. For example, the UE may provide preference of UL direction in a message to M node, and message may include the node ID and preference direction. In one exemplary embodiment, the M node may go with or reject UE's preference to route traffic to indicated S node. M node may request UE or S node for measurement results which may include any one or a combination of WLAN RSSI, AP loading, channel utilization, estimation data rate, interference level, and bandwidth. Measurement results may include any one or a combination of RSSI, RSRP, RSRQ, interference level, and bandwidth.

Figure 14:
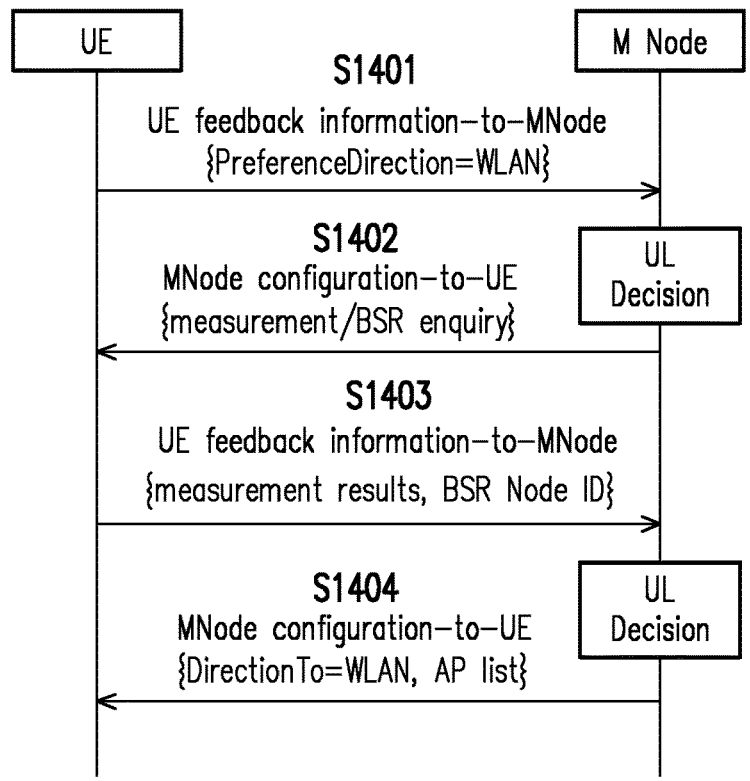
FIG. 14 illustrates a M node requiring more feedback information from a UE in accordance with one of the exemplary embodiments of the disclosure.

For the exemplary embodiment of FIG. 14, in step S1401, the UE may transmit a UE feedback information-to-MN node message which would include 'PreferenceDirection=WLAN' to M Node. Temporary UE capability or remaining capability may be included, e.g., hardware usage, BSR, antenna configuration, TX/RX opportunity, etc. A timer may be configured, e.g., by M node, not to re-transmit UE feedback information-MNode message. For example, a timer period is configured for event evaluation. In step S1402, the M node may request more feedback information from UE to set the configuration or to understand whether or not UE has this need by transmitting a MNode Configuration-to-UE message which may include an inquiry (e.g., BSR, PSCP sequence, UE capability, etc.). In step S1403, the UE would transmit a UE feedback information-to-MNode message which may include any one or a combination of measurement results, BSR, and Node. Based on the feedback information, in step S1404, the M node may provide configuration to UE via a MNode Configuration-to-UE message which may include any one or a combination of 'DirectionTo=WLAN', an AP list, a new channel number, and beam information. Alternatively, the UE may also request UL direction as 'DirectionTo=LTE' or Both 'DirectionTo=WLAN' and 'DirectionTo=LTE'. M node may go with UE's request.

Figure 15:
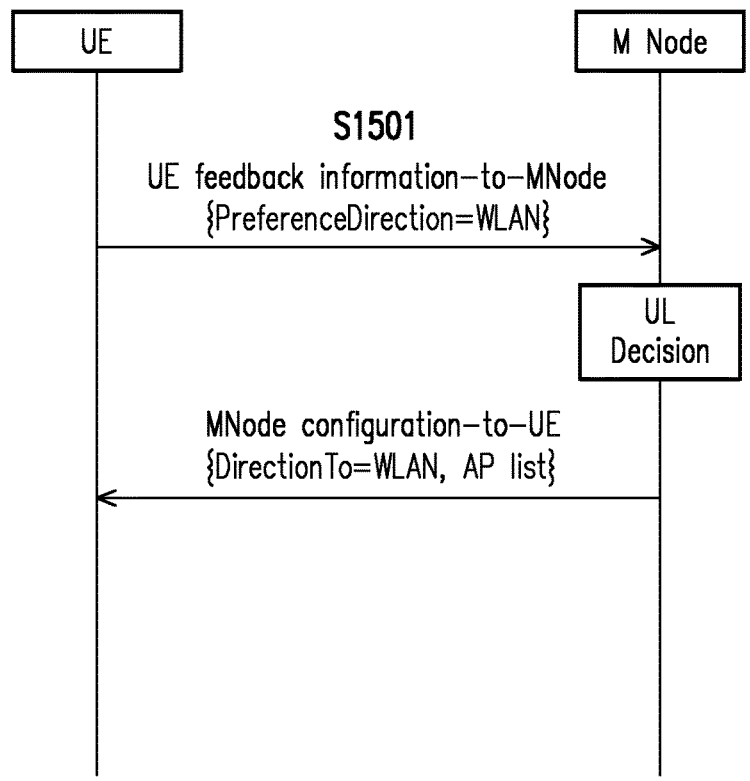
FIG. 15 illustrates a UE providing a preference of direction in accordance with one of the exemplary embodiments of the disclosure.

For the exemplary embodiment of FIG. 15, the UE in step S1501 would provide a preference of direction by transmitting to a M node a UE feedback information-to-MNode message which may include any one or a combination of a S node ID, 'preferenceDirection=WLAN', and an AP list. The content of the UE feedback information-to-MNode message could be determined based on UE's situation, measurement, preference, application, or etc. The M node may go with UE's preference by transmitting a MNode Configuration-to-UE message which may include 'DirectionTo=WLAN and/or an AP list.

For example, the temporarily connection loss of M node or S node may happen randomly (e.g., due the hardware issues, the radio resource, or the channel condition). UE may use "busy medium", "traffic congestion", or other settings to notify the network (e.g., M node). UE may prefer to maintain or resume the connection or the configuration after the temporarily connection lost or the temporarily unavailable. The M node may not release the UE context or the connection if the M node is aware of this condition. When the connection is recovered or when the corresponding hardware is available again, the UE may use the preference indication to update the condition or to resume the transmission.

For example, after a period of WLAN (e.g., module) temporarily unavailable of UE or S node (e.g., few seconds), UE may indicate that WALN is available again by the preference indication. The content of the indication may be still 'DirectionTo=WLAN', which is the same as the previous or the current M node configuration. The M node may be aware that WALN is available again at UE or S node. The M node may resume data transmission/reception or routing via S node (e.g., WLAN). The M node may not need to configure UE or S node again.

The preference indication may imply that a UE would like to increase or decrease the performance (e.g., data rate). For example, "increase performance", the preference indication may indicate "multiple RATs", may indicate "LTE only" with QoS requirement or QoE reporting. Further UE reporting may include unused or remaining UE capability, e.g., WLAN capability, higher modulation, carrier aggregation, etc. For example, "decrease performance", the preference indication may indicate "one RAT only" due to UE battery consumption, or may include additional information in measurement reporting, e.g., "reduce performance" (e.g., lower modulation, reduced number of carrier component, no multiple-input multiple-output (MIMO), no beamforming, etc.) due to overheating.

Figure 16:
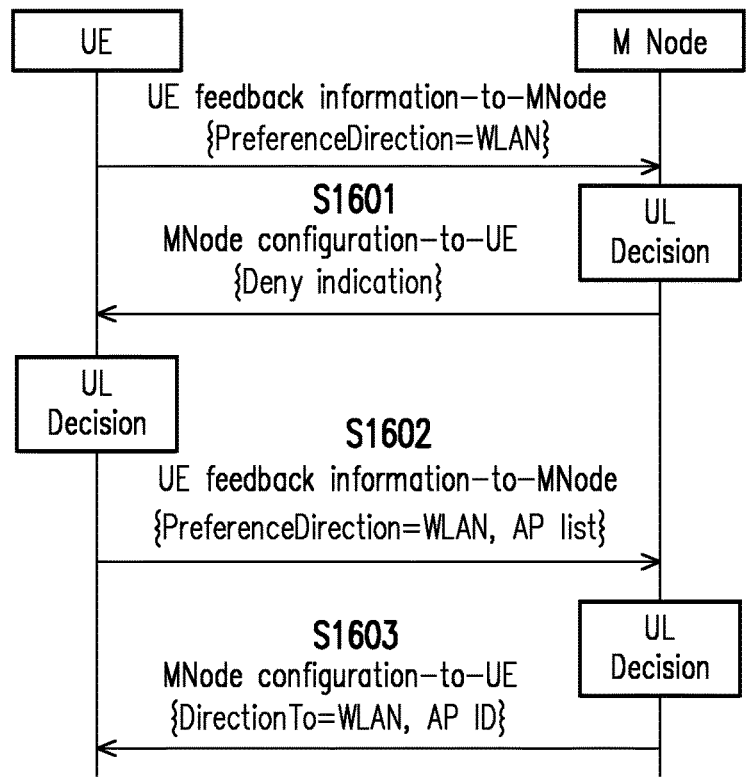
FIG. 16 illustrates a M node rejects UE's preference in accordance with one of the exemplary embodiments of the disclosure.

The exemplary embodiment of FIG. 16 is similar to the exemplary embodiments of FIG. 14 and FIG. 15; however, in step S1601, the UE receives a rejection via a deny indication from a MNode Configuration-to-UE message, which may further include a timer in which a UE is not allowed to retransmit the event indication. For example, M node would like not to reduce performance (e.g., data rate) for that UE. For example, M node is aware that a UE is in the situation of low power. In response, in step S1602, the UE would transmit a feedback information-to-MNode message which may include still a preference for performance increase or decrease, or for a RAT preference, e.g., WLAN (e.g. 'PreferenceDirection) and an AP list. In step S1603, the M node may still reject or accept UE's request, for example, select an AP to serve the UE by transmitting a MNode Configuration-to-UE message which includes an AP ID that correspond to the AP selected by the M node from the AP list and 'DirectionTo=WLAN'.

The following exemplary embodiments are related to the triggering event of 'traffic congestion'. In the event that the M node detects traffic congestion in the LTE cellular service, the M node may command the UE to configure its split bear to schedule or route data to WLAN only. To detect traffic congestion, data/PDCP PDUs/WLAN MAC buffer scheduled/routed to WLAN would need to exceed or equal to a threshold. M node may detect traffic congestion by the feedback information, e.g., buffer status report, PDCP status, WLAN status, etc. M node may further accept or reject UE's request or actions in responding to the event indication. The S node may also indicate an overloading situation. The M node may resolve the situation by configuring the amount of traffic per UEs via direction commands to any one of the UEs.

For example, a transmitter (UE WLAN) may suffer the problem of traffic congestion. A UE, such as WLAN MAC may drop some packets which are buffered for a long time or are over a buffer size so that the dropping rate may be increased. For example, traffic congestion may be resulted from hardware over-heating or hardware sharing, so that QoS or QoE may not be satisfied. The M node could be aware of such issue via PDCP sequence number (e.g., PDCP Status Report) or BSR reporting. The M node may determine that a particular AP is causing such transmission problem. A UL direction may then be modified to transmit to the LTE instead of the AP that is causing the problem. However, there could be multiple causes to this situation. Examples may include (1) bad WLAN radio condition, (M node may then modify a particular AP, an AP list, new channel number) (2) AP overloading, (e.g. lack of WLAN resource. M node may reduce the number of UEs associating with the same AP, a new AP list, etc.), (3) a huge number of accounts, (M node may reduce the number of UEs associating with the same AP, a new AP list, etc.), (4) buffer overloading, (e.g., WLAN MAC/LTE buffer/UE buffer may overload. UL direction may be modification. Data routing needs restriction, e.g., the amount of data to WLAN is adjusted.) M node may determine UL direction with or without feedback information. S node or UE-assisted feedback could be used to assist the decision of UL direction. In the view of system, WLAN or S node could be efficiently used if a new event indication or feedback information is enabled or enhanced.

For example, UE may be aware of events about internal signaling of overloading of WLAN MAC buffer or PDCP PDUs. The M node may have options to understand issues such as from BSR inquiry. The M node may have options to resolve issues such as by re-direction of reporting UE, re-direction of other UEs served by the same WLAN, or by suspending DL/UL transmission (e.g. S node connection/transmission/reception may be temporarily unavailable).

Figure 17:
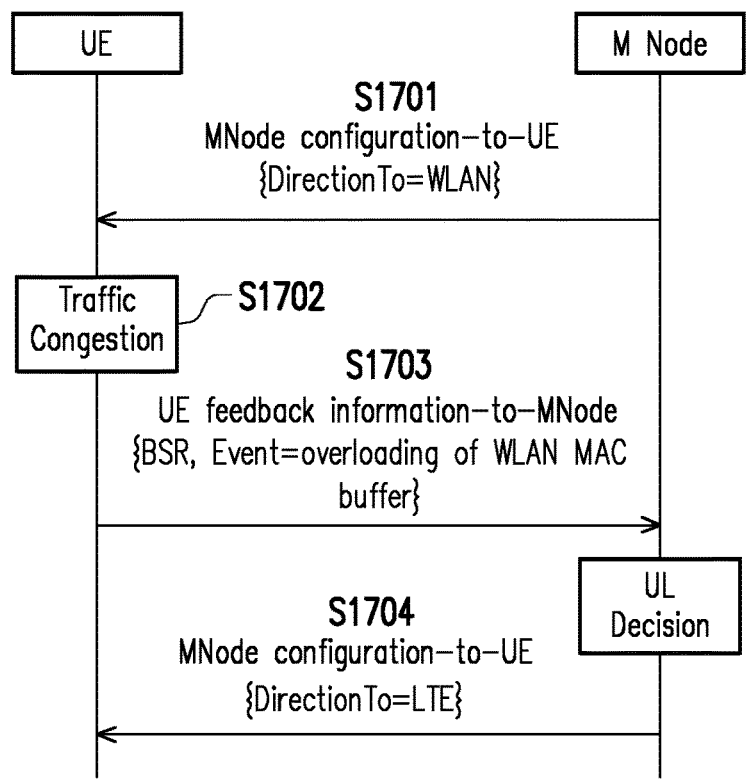
FIG. 17 illustrates a M node commanding a UE to schedule or route data to a WLAN only in accordance with one of the exemplary embodiments of the disclosure.

For the exemplary embodiment of FIG. 17, in step S1701, the M node commands UE to schedule/route data (e.g., split/configurable bearer) to WLAN only. However, in step S1702, traffic congestion occurs in the UE as the UE is not satisfied with the configuration which may cause issues in UE as the UE buffer could be under heavy loads or overloading. In step S1703, the UE would communicate such information by transmitting the WLAN link status via internal signaling of overloading of WLAN MAC buffer. The UE may also feedback BSR, measurement report, event indication, and etc. In step S1704, M node may obtain this real-time information and may determine a new UL direction which could be 'DirectionTo=LTE'.

Figure 18:
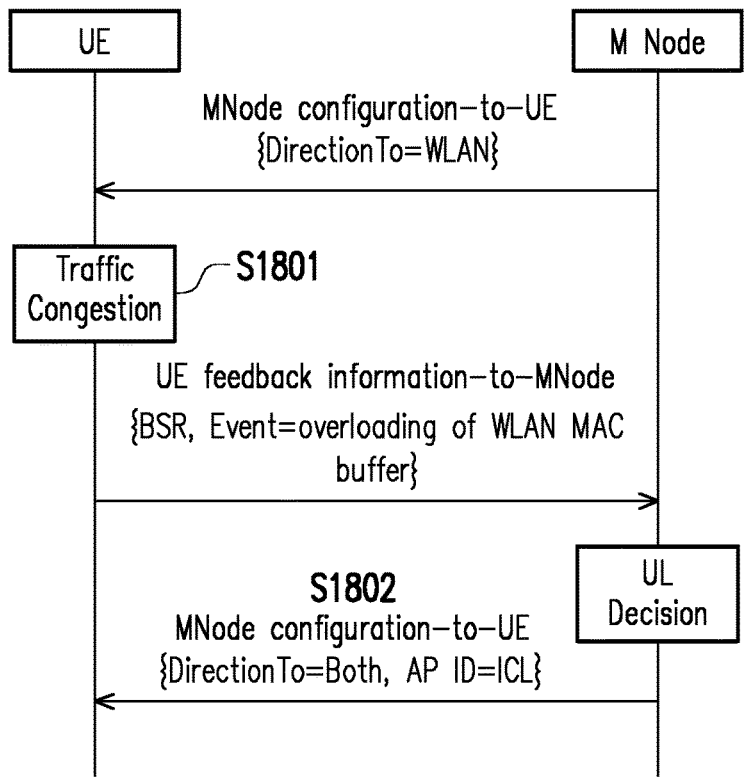
FIG. 18 illustrates contents of a UE buffer in accordance with one of the exemplary embodiments of the disclosure.

For the exemplary embodiment of FIG. 18, the UE buffer may include a UE S node or WLAN buffer or a UE M node or LTE buffer. The exemplary embodiment of FIG. 18 is similar to the exemplary embodiment of FIG. 17 except that the UL direction may be modified. Because of traffic congestion (S1801), the traffic is steered back to LTE and WLAN (S1802). Also a specific AP may be also included by transmitting the AP ID from the M Node to the UE.

Figure 19:
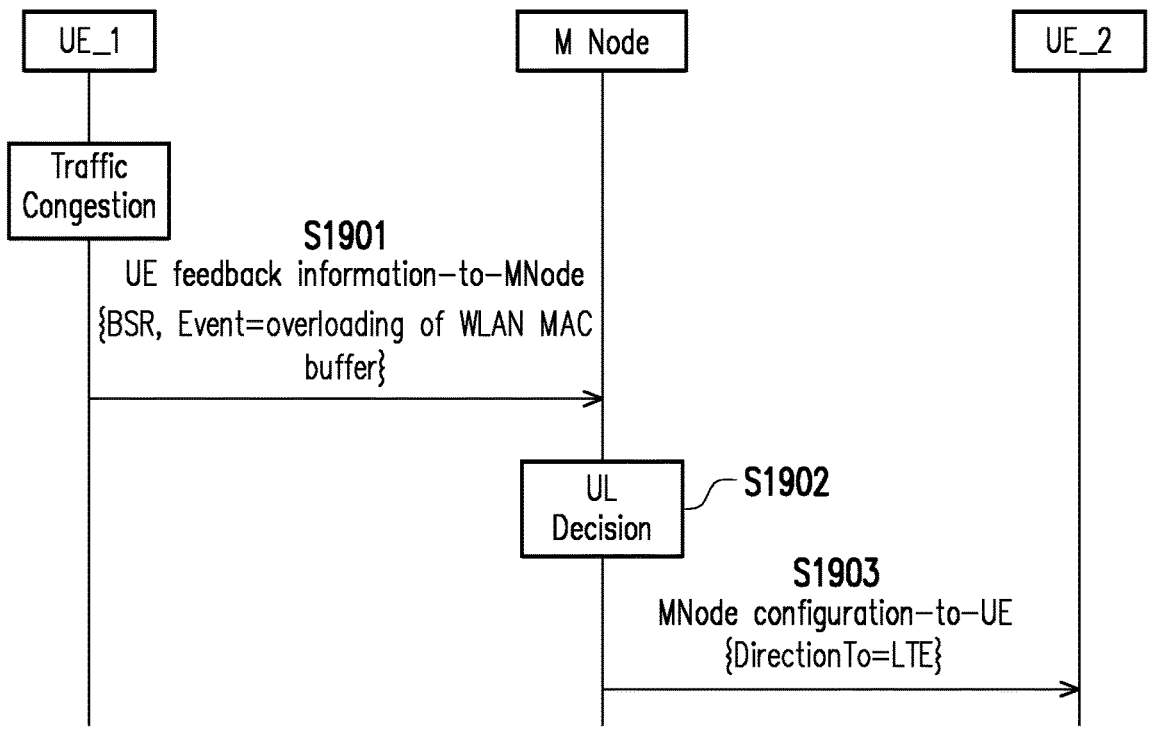
FIG. 19 illustrates a feedback from UE to indicate traffic congestion in accordance with one of the exemplary embodiments of the disclosure.

For the exemplary embodiment of FIG. 19, UE_1 may feedback a triggering event indicator which indicates 'traffic congestion' as well as an AP ID associated with the traffic congestion (S1901). This may occur if too many UEs are using a WLAN/AP. M node may be aware of this situation. UE_1 and UE_2 are served under the same WLAN/AP. In step S1902, the M node may determine whether UE_1 has priority as well as determining the direction command, AP list, transmission suspension, channel selection as described in previous examples. If UE_1 is determined to have priority, in step S1903, the M node may re-direct UE_2 to another WLAN/AP or LTE so that more WLAN resource could be reserved for UE_1. Alternatively, the M node may receive information of traffic congestion from a S node. The M node may then determine whether to suspend transmission to the S node or to re-direct UEs to another WLAN/AP or LTE to resolve this issue in the S node.

Figure 20:
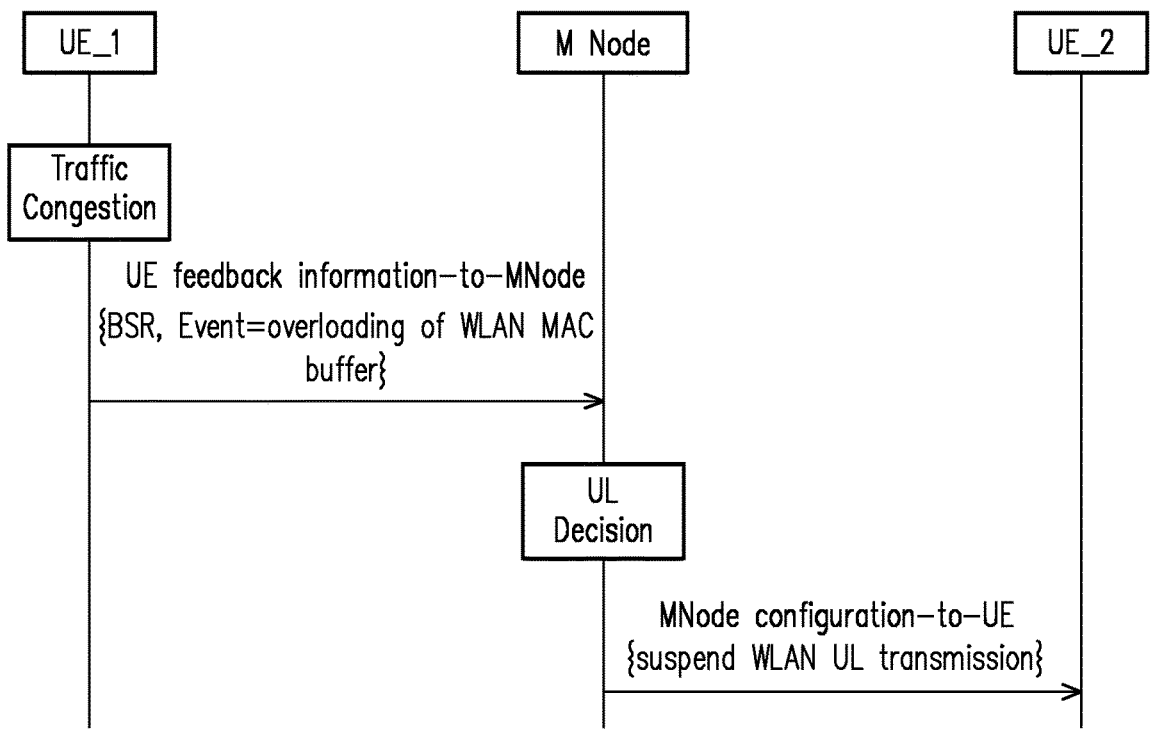
FIG. 20 illustrates a M node receiving an indicator which indicates traffic congestion in accordance with one of the exemplary embodiments of the disclosure.

For exemplary embodiment of FIG. 20 is similar to FIG. 19. In response to the M node receiving feedback of traffic congestion from UE_1. In order to reserve more WLAN resources for UE_1, the M node may suspend UE_2 for WLAN UL transmission for a time period. Other options may further include new AP list for UEs, dedicated AP ID, direction to both links, to request S node to reserve more WLAN resource (e.g., radio resource, hardware resource, etc.), and etc.

Figure 21:
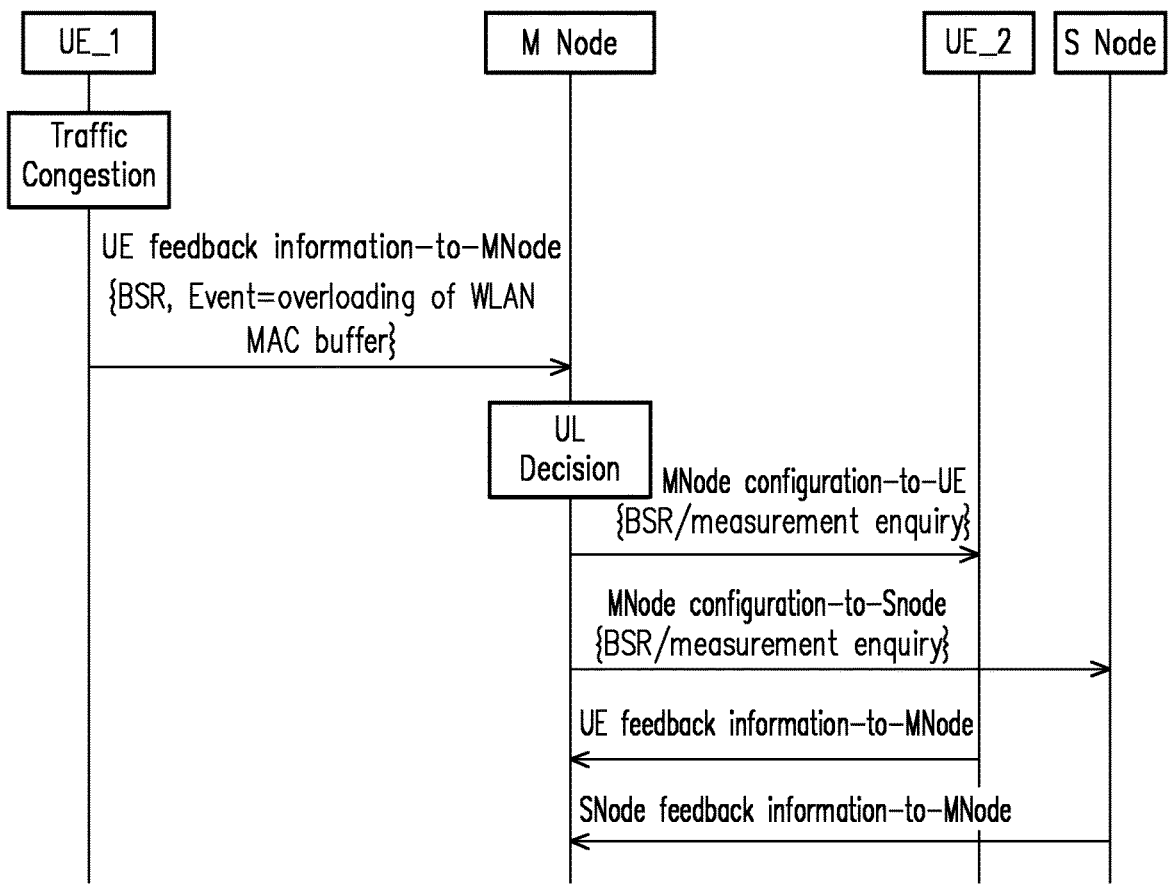
FIG. 21 illustrates a M node receiving an indicator which indicates traffic congestion by requesting feedback from S node or UE in accordance with one of the exemplary embodiments of the disclosure.

For the exemplary embodiment of FIG. 21, the M node may receive a feedback of traffic congestion from UE_1. To further understand this event, the M node may request feedback information from S nodes or UEs to determine whether or not this is a single event or a problem caused by WLAN/AP. Feedback information from UE may include BSR, measurement results, buffer latency, hardware usage information, UE capability remaining information, etc. Feedback information from S node may include measurement results, S node situation (e.g., loading, latency), etc. By using UE or S node feedback information, M node may be aware of WLAN TX/RX situation (e.g., the cause of temporarily unavailable WLAN module, the corresponding period, etc.). Correspondingly, M node may configure UEs for further operations. M node may take actions as mentioned in previous embodiments such as by issuing a direction command, an AP list, a transmission suspension, a new channel selection, and etc.

In summary, the MNode Configuration-to-UE message may include any one or a combination of {direction command, e.g., {LTE, WLAN, both}, scheduling/routing restriction (e.g., Prioritized Bit Rate (PBR), priority for logical channel prioritization, amount of data in routing), events (e.g., traffic demand, busy medium/bad channel condition, preference direction, traffic congestion, hardware issues, etc.), thresholds/parameters in event triggering evaluation (e.g., threshold value, time period, etc.), time period, transmission suspension, channel selection, S node/cell/beam/sector information (e.g., ID, sequence, code, list, channel number, bandwidth, spectrum frequency, etc.) (e.g., WLAN, higher frequency node, NR node, LAA node, etc.), enable of event triggering or even indication, indication of S node in the list, TX/RX opportunity/duration, measurement configuration, measurement reporting, measurement request/enquiry, BSR configuration (e.g., content, format, header, index of table, etc.), BSR reporting/triggering (e.g., Triggered reporting), BSR request/enquiry, etc.}, radio configuration (e.g., channel number, bandwidth, spectrum frequency, antenna, MCS, LWA/DC/aggregation activation/deactivation, transmit power level, etc.) which may be implemented by new message/signaling/indication, RRC-ConnectionReconfiguration, Measurement Control, or System Information.

A UE feedback information-to-MNode message may include any one or a combination of {event indication (e.g., preference, overloading indication, huge traffic enquiry, failure transmission, bad channel condition, traffic command, hardware issues, etc.), measurement reporting/results (e.g., M node, S node, licensed/unlicensed spectrum) (e.g., RSRP, RSRQ, RSSI/channel occupancy of unlicensed spectrum, interference level, WLAN RSSI, WLAN measurement results, error rate, dropping rate, beam information, buffer latency, unavailable period, etc.), S node/cell/beam/sector information (e.g., ID, list, TX/RX opportunity/duration, spectrum frequency, etc.), priority of UEs or traffic flow, indication of BSR table, BSR reporting, etc., which may be implemented by new message/signaling/indication, RRC-ConnectionReconfigurationComplete, or Measurement Report, which may be triggered by eNB Configuration or events.

A MNode Configuration-to-SNode message may include any one or a combination of {measurement request/enquiry (e.g., channel condition, etc.), WLAN/AP situation request/enquiry, enable event indication, new configuration (e.g., node ID/sequence, channel number, beam information, spectrum frequency, etc.), TX/RX opportunity/duration, transmission suspension, channel selection, etc.}, which may be implemented by new message/signaling/indication, etc.

SNode feedback information-to-MNode message may include any one or a combination of {measurement results (e.g., WLAN measurement results, RSSI/channel occupancy of unlicensed spectrum, etc.), S node situation (e.g., overloading indication, high interference indication, etc.), event indication, LWA performance (e.g., loading, buffer latency, etc.), preference, node ID, beam information, spectrum frequency, channel number, bandwidth, TX/RX opportunity/duration, priority of UEs or traffic flow, etc.}, which may be implemented by new message/signaling/indication, which may be triggered by eNB Configuration or events.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method used by a user equipment based on user equipment (UE) assisted feedback, the method comprising:
   receiving an enable indicator which indicates a first feedback signaling to be transmitted;
   receiving a first configuration message comprising a timer configuration of a first timer, wherein the timer configuration of the first timer comprises a duration for the first timer;
   detecting one of a plurality of triggering events;
   transmitting the first feedback signaling comprising a first preferred configuration of a wireless connection in response to one of the plurality of triggering events is detected, wherein the wireless connection comprises a licensed wireless connection and a licensed-assisted access connection; and
   starting the first timer in response to transmitting the first feedback signaling.

2. The method of claim 1, wherein the first configuration message further comprises a timer configuration of a second timer and a timer configuration of a third timer, wherein the timer configuration of the second timer comprises a duration for the second timer, and the timer configuration of the third timer comprises a duration for the third timer.

3. The method of claim 2 further comprising:
   re-transmitting, after transmitting the first feedback signaling, the first feedback signaling after the first timer has expired without receiving any configuration message associated with the first feedback signaling.

4. The method of claim 2 further comprising:
   starting the second timer in response to transmitting the first feedback signaling;
   performing another iteration of the detection of one of the plurality of triggering events after transmitting the first feedback signaling; and
   transmitting, after transmitting the first feedback signaling, a second feedback signaling comprising a second preferred configuration in response to performing the another iteration of the detection after the second timer has expired.

5. The method of claim 1 further comprising:
   receiving a second configuration message which comprises a deny indicator which rejects the first preferred configuration.

6. The method of claim 2 further comprising:
   receiving a second configuration message which comprises a deny indicator which rejects the first preferred configuration;
   starting the third timer in response to receiving the second configuration message;
   performing another iteration of the detection of one of the plurality of triggering events after receiving the first configuration; and
   transmitting, after receiving the second configuration message, a third feedback signaling comprising the second preferred configuration in response to performing the another iteration of the detection after the third timer has expired.

7. The method of claim 5, wherein the second configuration message further comprises one or a combination of inquiring an updated preferred configuration, an updated status report, and an updated measurement report.

8. The method of claim 1 further comprising:
   receiving, after transmitting the first feedback signaling, a third configuration message comprising one or a combination of a configured radio configuration and a configured direction command.

9. The method of claim 1, wherein the first preferred configuration comprising one of updating a radio configuration, a direction command, a status report, a measurement report, and an updating cause.

10. The method of claim 1, wherein detecting the plurality of triggering events further comprising:
    detecting any one of loading, buffer latency, buffered data, packet loss, error rate, dropping rate, data rate, channel, bandwidth, spectrum frequency, MCS, and hardware issues.

11. The method of claim 9, wherein the radio configuration comprising one or a combination of channel, frequency, MCS, bandwidth, data rate, coding rate, buffer size, power level, antenna configuration, and aggregation capability.

12. The method of claim 9, wherein the direction command indicates one or a combination of a LTE wireless connection, a second wireless connection and an identifier (ID) associated with the second wireless connection, and both the LTE wireless connection and the second wireless connection.

13. The method of claim 1, wherein the triggering events comprise one or a combination of traffic demand, busy medium, preference direction, and traffic congestion.

14. A user equipment comprising:
a transmitter;
a receiver; and
a processor coupled to the transmitter and the receiver and is configured at least to:
receive, by the receiver, an enable indicator which indicates a first feedback signaling to be transmitted;
receive, by the receiver, a first configuration message comprising a timer configuration of a first timer wherein the timer configuration of the first timer comprises a duration for the first timer;
detecting a plurality of triggering events;
transmit, via the transmitter, a first feedback signaling comprising a first preferred configuration of a wireless connection in response to one of the plurality of triggering events is detected, wherein the wireless connection comprises a licensed wireless connection and a licensed-assisted access connection; and
start the first timer in response to transmitting the first feedback signaling.

15. The user equipment of claim 14, wherein the triggering events comprise one or a combination of traffic demand, busy medium, preference direction, and traffic congestion.

16. A base station comprising:
a transmitter;
a receiver; and
a processor coupled to the transmitter and the receiver and is configured at least to:
receive a first feedback signaling comprising a preferred configuration of a wireless connection, wherein the preferred configuration comprises a preferred direction and the wireless connection comprises a licensed wireless connection and a licensed-assisted access connection;
transmit a first configuration message which comprises one or a combination of a status report inquiry and a measurement inquiry associated with one or more radio access technologies (RATs) in response to receiving the first feedback signaling;
receive a second feedback signaling comprising a measurement report associated with the measurement inquiry in response to transmitting the first configuration message; and
transmit a second configuration message to update the preferred configuration in response to receiving the measurement report,
wherein the second configuration message further comprises a first timer which indicates a time period between transmitting and re-transmitting the first feedback signaling by a user equipment.

17. The base station of claim 16, wherein the first configuration message further comprises a deny indicator which rejects the preferred configuration.

18. The base station of claim 16, wherein the first feedback signaling further comprising a quality of experience (QoE) evaluation for fulfilling a performance requirement.

19. The base station of claim 16, wherein the second configuration message further comprises a second timer which indicates a time period between transmitting the first feedback signaling and transmitting the second feedback signaling by the user equipment, and a third timer which indicates a time period between receiving the first configuration and a third feedback signaling by the user equipment.

20. The base station of claim 16, wherein the processor is further configured to:
transmit, after receiving the first feedback signaling, a third configuration message comprising one or a combination of a radio configuration and a direction command.

21. The base station of claim 20, wherein the preferred configuration comprising one or a combination of updating the radio configuration, the direction command, the status report, the measurement report, and an updating cause.

22. The base station of claim 18, wherein the QoE evaluation comprising one or a combination of loading, buffer latency, buffered data, packet loss, error rate, dropping rate, data rate, channel, bandwidth, spectrum frequency, MCS, and hardware issues.

23. The base station of claim 20, wherein the radio configuration comprising one or a combination of channel, frequency, MCS, bandwidth, data rate, coding rate, buffer size, power level, antenna configuration, and aggregation capability.

24. The base station of claim 20, wherein the direction command indicates one or a combination of a LTE wireless connection, a second wireless connection and an identifier (ID) associated with the second wireless connection, and both the LTE wireless connection and the second wireless connection.

* * * * *